US011531714B2

(12) United States Patent
König et al.

(10) Patent No.: US 11,531,714 B2
(45) Date of Patent: Dec. 20, 2022

(54) SYSTEMS AND METHODS FOR CLOUD-BASED CONTENT MANAGEMENT AND DISTRIBUTION

(71) Applicant: Apple Inc., Cupertino, CA (US)

(72) Inventors: George R. König, Campbell, CA (US); Rachana K. Gupta, San Jose, CA (US); Suchita C. Doshi, San Jose, CA (US); Taskin Ahmed Rahman, Morgan Hill, CA (US); Deepak Batra, San Jose, CA (US); Andreas Jozef Maria Abelmann, Utrecht (NL); Vincent T. Frisina, New York, NY (US); Pepijn T. Zoon, Haarlem (NL); Caroline J. Crandall, Woodside, CA (US); Gregory Vincent Gaudio, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/789,165

(22) Filed: Feb. 12, 2020

(65) Prior Publication Data

US 2020/0301978 A1 Sep. 24, 2020

Related U.S. Application Data

(60) Provisional application No. 62/822,494, filed on Mar. 22, 2019.

(51) Int. Cl.

*G06F 40/197* (2020.01)
*G06F 16/93* (2019.01)
(Continued)

(52) U.S. Cl.

CPC .......... *G06F 16/93* (2019.01); *G06F 16/2282* (2019.01); *G06F 16/285* (2019.01);
(Continued)

(58) Field of Classification Search

None
See application file for complete search history.

(56) References Cited

U.S. PATENT DOCUMENTS 6,005,560 A * 12/1999 Gill ....................... G06F 40/166 715/205
9,053,190 B1 * 6/2015 Boenau ............... G06F 16/3323
(Continued)

OTHER PUBLICATIONS

Lucidpress Online Print Digital Publishing Software; https;//www.lucidpress.com, pp. 1-13, published Oct. 2013.
(Continued)

*Primary Examiner* — Kyle R Stork
(74) *Attorney, Agent, or Firm* — Fletcher Yoder PC

(57) ABSTRACT

The present disclosure relates to cloud-based techniques that may be used to manage how digital content is arranged and distributed. For example, a non-transitory, computer-readable medium may include instructions that, when executed, are configured to cause processing circuitry to provide a cloud-based application that maintains an editable draft issue comprising a plurality of draft articles, generate a published issue that has a plurality of published articles corresponding to the plurality of draft articles based on the draft issue, and provide the published issue to one or more electronic devices.

20 Claims, 29 Drawing Sheets

(51) Int. Cl.

| | |
|---|---|
| ***G06F 16/22*** | (2019.01) |
| ***G06F 16/28*** | (2019.01) |
| ***G06F 16/904*** | (2019.01) |
| ***G06F 21/44*** | (2013.01) |
| ***G06F 40/106*** | (2020.01) |
| ***G06Q 30/02*** | (2012.01) |
| ***G06Q 30/00*** | (2012.01) |
| ***H04L 67/10*** | (2022.01) |
| ***G06F 40/177*** | (2020.01) |
| ***G06Q 10/10*** | (2012.01) |
| *H04L 67/565* | (2022.01) |

(52) U.S. Cl.

CPC ............ *G06F 16/904* (2019.01); *G06F 21/44* (2013.01); *G06F 40/106* (2020.01); *G06F 40/177* (2020.01); *G06F 40/197* (2020.01); *G06Q 10/10* (2013.01); *G06Q 30/018* (2013.01); *G06Q 30/0276* (2013.01); *H04L 67/10* (2013.01); *H04L 67/565* (2022.05)

(56) References Cited

U.S. PATENT DOCUMENTS

| | | | | |
|---|---|---|---|---|
| 2002/0023093 | A1* | 2/2002 | Ziff | G06F 16/958 |
| 2008/0077870 | A1* | 3/2008 | Napoleon | G06F 40/226<br>715/762 |
| 2009/0207903 | A1 | 8/2009 | John | |
| 2009/0279117 | A1* | 11/2009 | Kondo | H04N 1/00204<br>358/1.14 |
| 2013/0073998 | A1 | 3/2013 | Migos et al. | |
| 2013/0145257 | A1* | 6/2013 | Shalabi | G06F 40/186<br>715/243 |
| 2013/0151231 | A1* | 6/2013 | Giraudy | G06F 40/40<br>704/2 |
| 2014/0075275 | A1 | 3/2014 | Aleksandrovsky et al. | |
| 2015/0185982 | A1* | 7/2015 | Hicks | G06F 3/0488<br>715/776 |

OTHER PUBLICATIONS

MagLoft—Digital Magazines; http://sss.magloft.com/how-it-works, pp. 1-7, published Apr. 27, 2017.

* cited by examiner

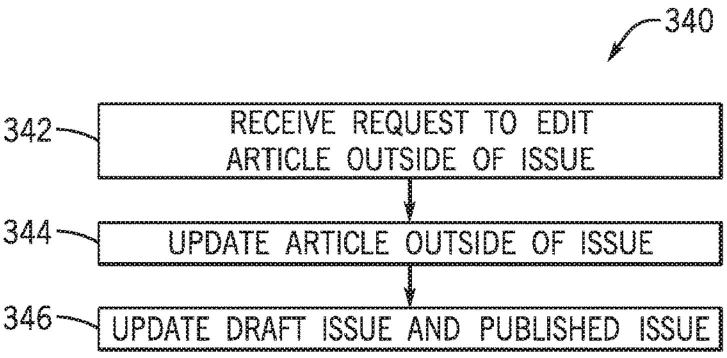
FIG. 21
FIG. 22
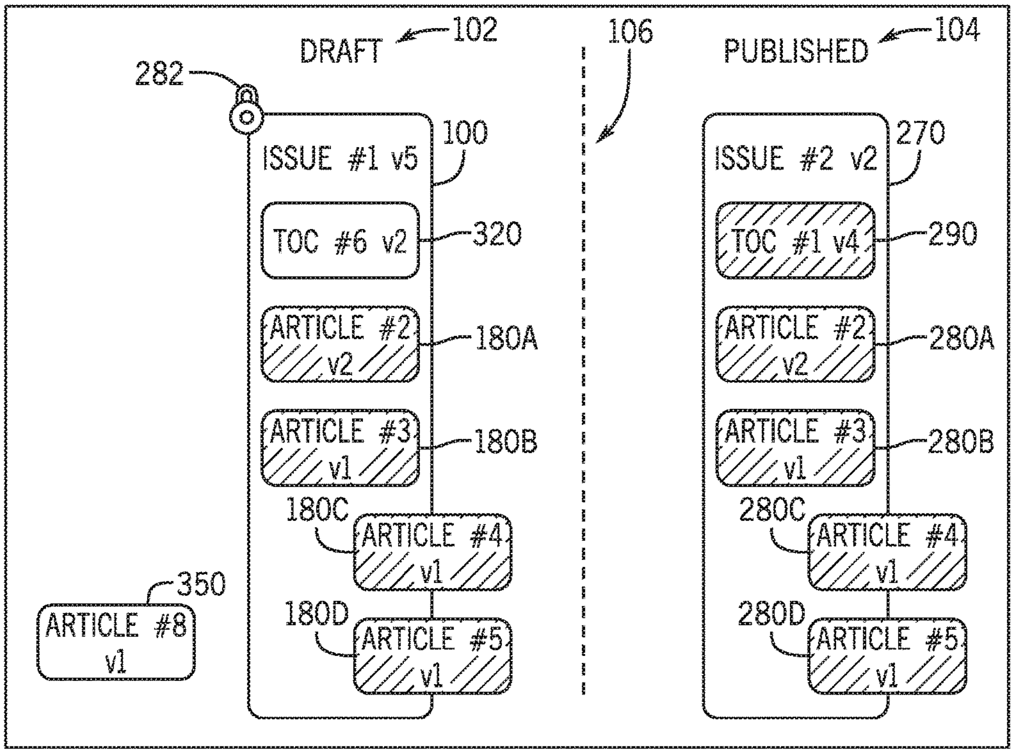

SYSTEMS AND METHODS FOR CLOUD-BASED CONTENT MANAGEMENT AND DISTRIBUTION

CROSS-REFERENCE TO RELATED APPLICATIONS

This application claims priority to U.S. Provisional Patent Application No. 62/822,494, entitled "SYSTEMS AND METHODS FOR CLOUD-BASED CONTENT MANAGEMENT AND DISTRIBUTION," filed on Mar. 22, 2019, which is incorporated herein by reference in its entirety for all purposes.

BACKGROUND

The present disclosure generally relates to a media content editing system and, more particularly, to a cloud-based system that may be utilized to organize and provide digital magazine issues.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Users of electronic devices may access articles (e.g., news articles) written by content providers, for example, via the internet. For example, users may be provided with digital versions of printed newspapers, magazines, or portions thereof. In other cases, individual articles that are not included in collections may be available.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to cloud-based digital content management and distribution techniques. More specifically, providers of content such as articles may make digital collections (e.g., an issue) of content to be distributed to electronic devices utilized by potential users of the content, such as people interested in reading articles provided by the content provider. Additionally, the techniques disclosed herein enable a table of contents to be generated based on the content included in a content provider-created issue. Content providers may also customize tables of contents.

While a content provider is making or arranging an issue, the issue may be kept private. However, a content provider may publish an issue to enable the issue to be made publically available. As discussed herein, a draft version of an issue and a published version of an issue may be generated and managed. Furthermore, the present disclosure provides for content to be modified after publication. By utilizing multiple versions of content, it is possible to make changes to a draft version of the content while a published version of the content is still available and without making the changes (e.g., simultaneously) to the published content. When a content provider has finished editing the content (e.g., the draft version of the content), the published version of the content may be modified based on the changes made to the draft version. As such, the present techniques enable digital content to be managed without affecting a published, or public, version of the content.

Furthermore, as discussed herein, content included in arrangements (e.g., issues), may be specific to a collection. For example, content may only be published in one collection. Content may also be provided solely outside of a collection, such as an individually published article. In addition, the present techniques enable content to be included in one collection and also included outside of the collection. For example, a content provider may make an issue of articles, and one or more articles included in the issue may also be included in other issues or published individually. Accordingly, the present disclosure provides techniques to arrange and provide content in a manner unique to digital content.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 21 illustrates a flow diagram of a process for updating a published issue based on a change made outside of the published issue or a corresponding draft issue, according to embodiments of the present disclosure;

FIG. 22 is a block diagram illustrating a draft issue, a published issue, and an outside article, according to embodiments of the present disclosure;

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

The present disclosure relates to a media content publishing system that may be utilized to arrange and provide content to end users' electronic devices. More specifically, the media content publishing system may be implemented via a cloud computing system and obtain content (e.g., articles) from content providers, enable content providers to interact with the media content publishing system to arrange the content, and provide the content to electronic devices. In particular, as discussed below, articles may be arranged into issues, and the issues may be disseminated to electronic devices for viewing via the electronic devices. In some cases, articles included in an issue may be available for viewing outside of an issue. Accordingly, the techniques discussed below enable the management and provision of issue-specific articles and issue-independent articles.

Figure 1:
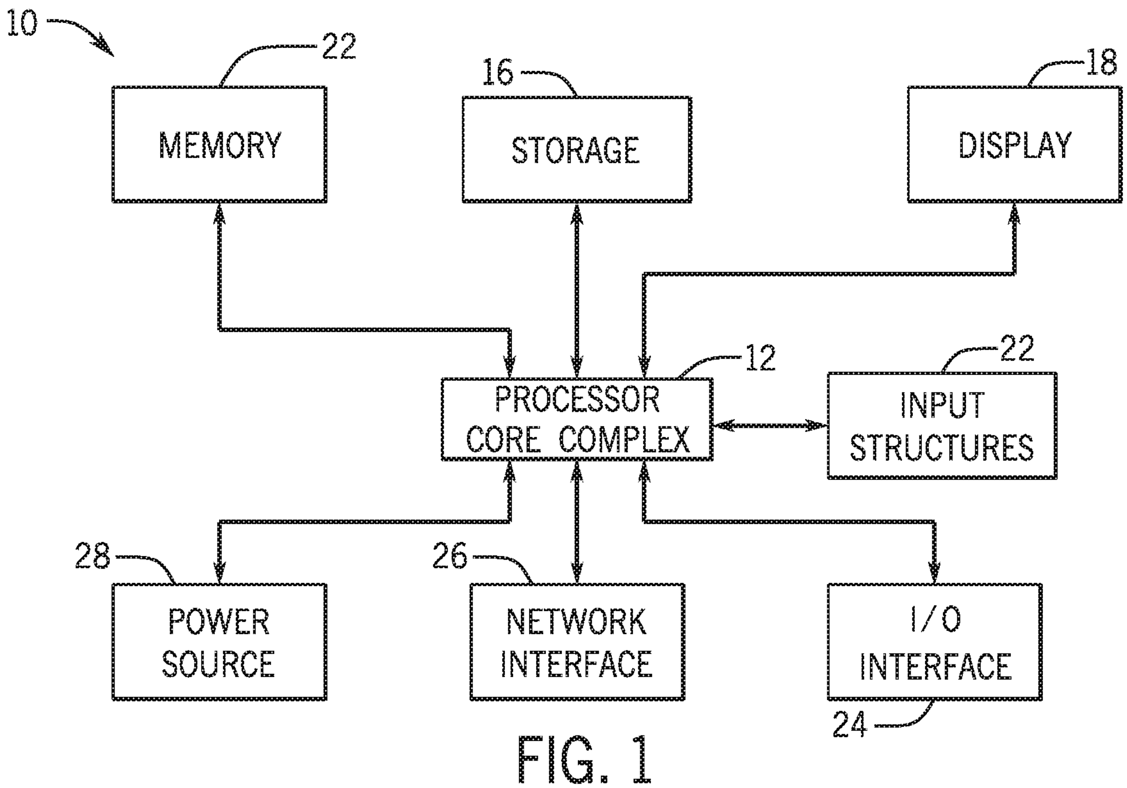
FIG. 1 is a schematic block diagram of an electronic device that provides linked text boxes, according to embodiments of the present disclosure.
Figure 2:
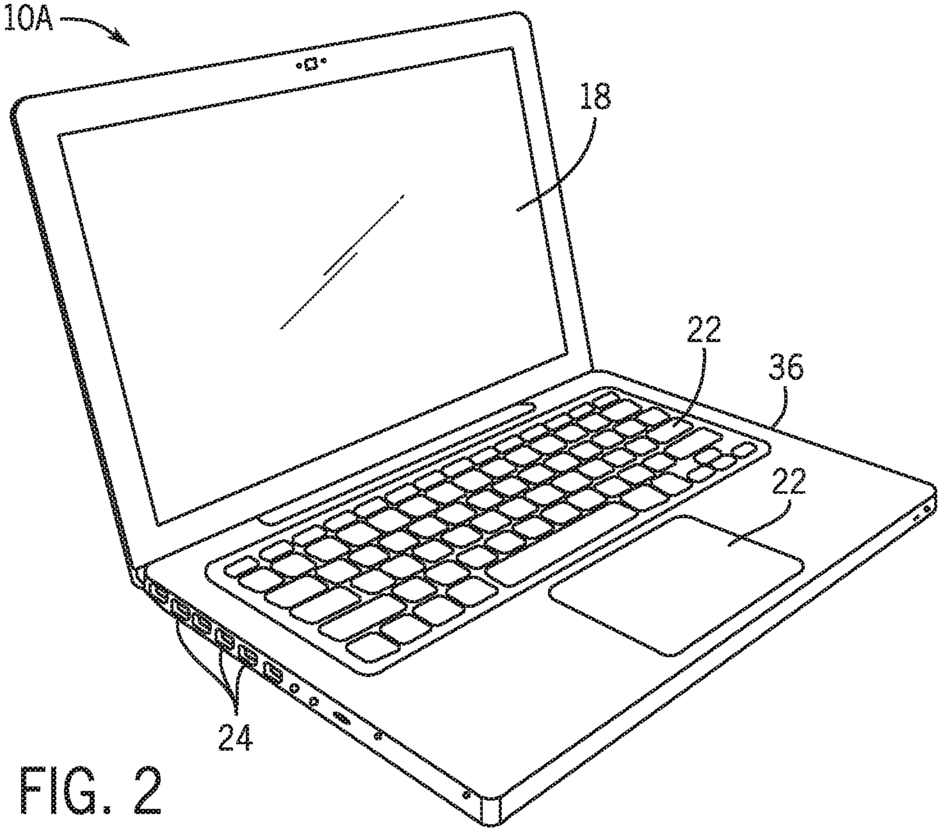
FIG. 2 is a perspective view of a notebook computer representing an embodiment of the electronic device of FIG. 1.
Figure 4:
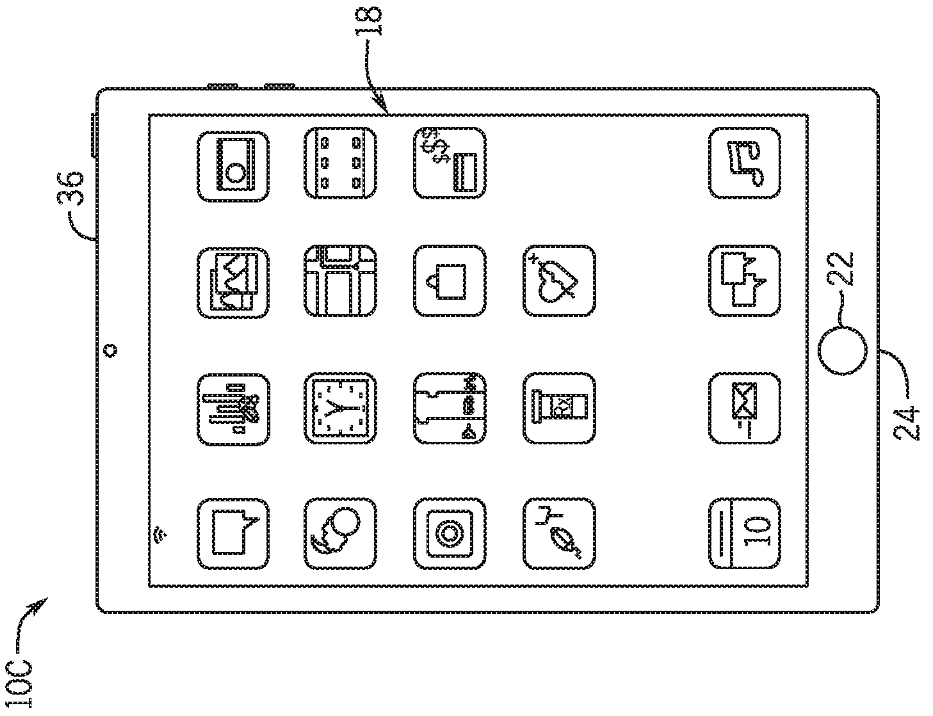
FIG. 4 is a front view of another hand-held device representing another embodiment of the electronic device of FIG. 1.
Figure 3:
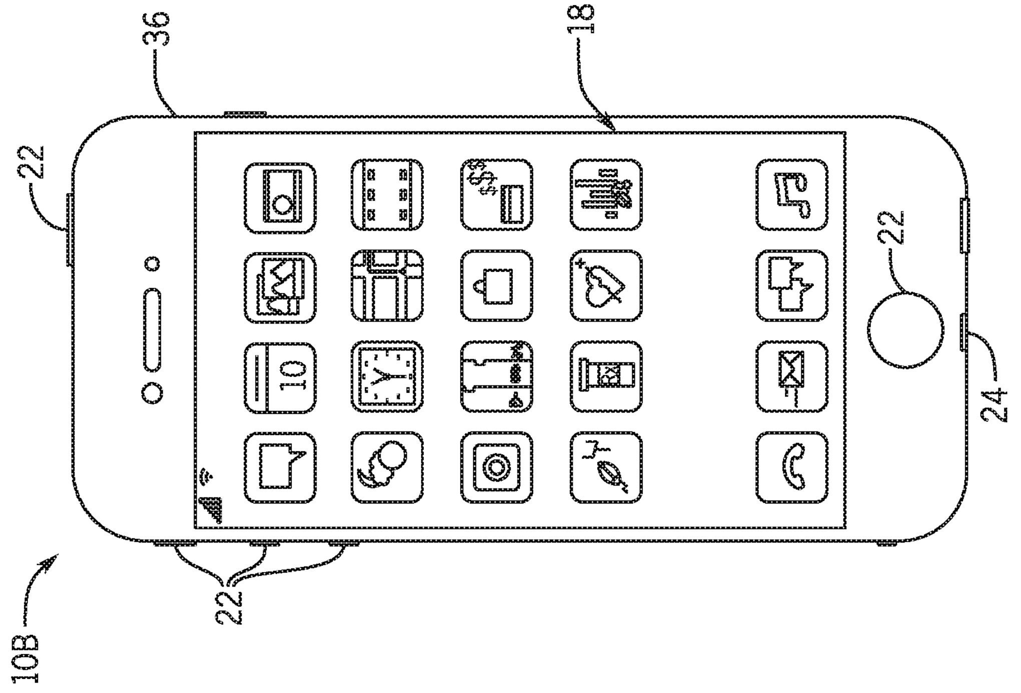
FIG. 3 is a front view of a hand-held device representing another embodiment of the electronic device of FIG. 1.
Figure 5:
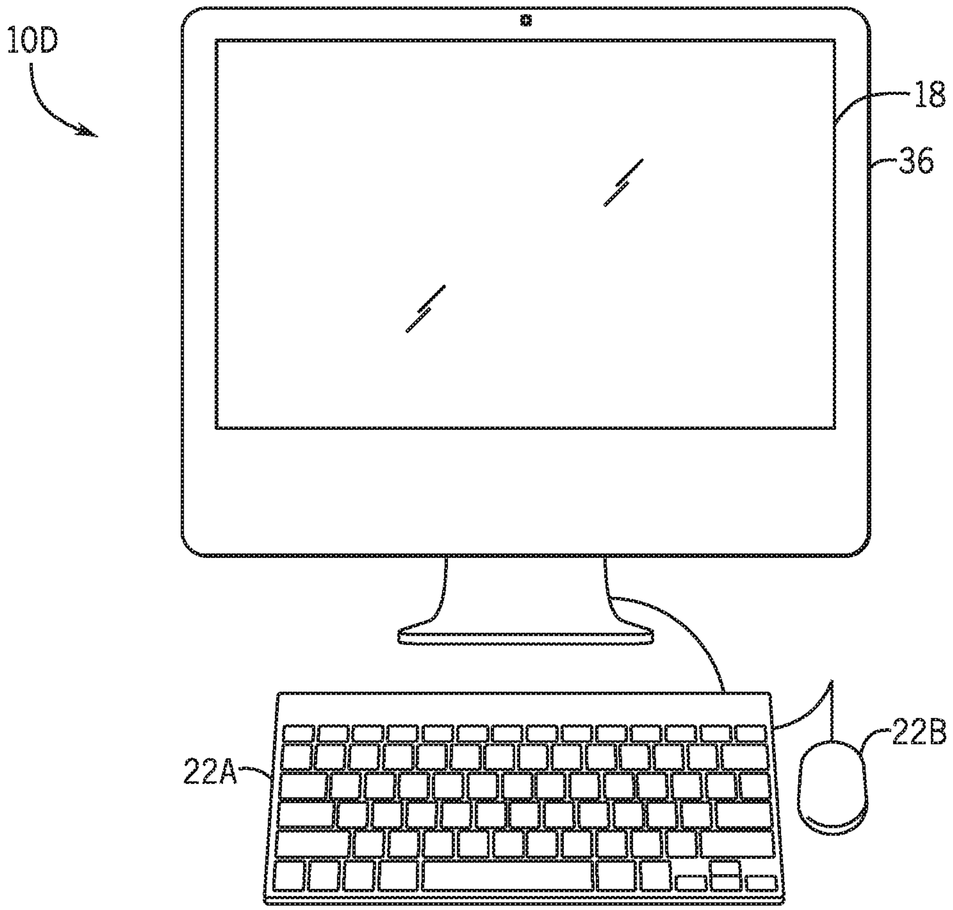
FIG. 5 is a front view of a desktop computer representing another embodiment of the electronic device of FIG. 1.
Figure 6:
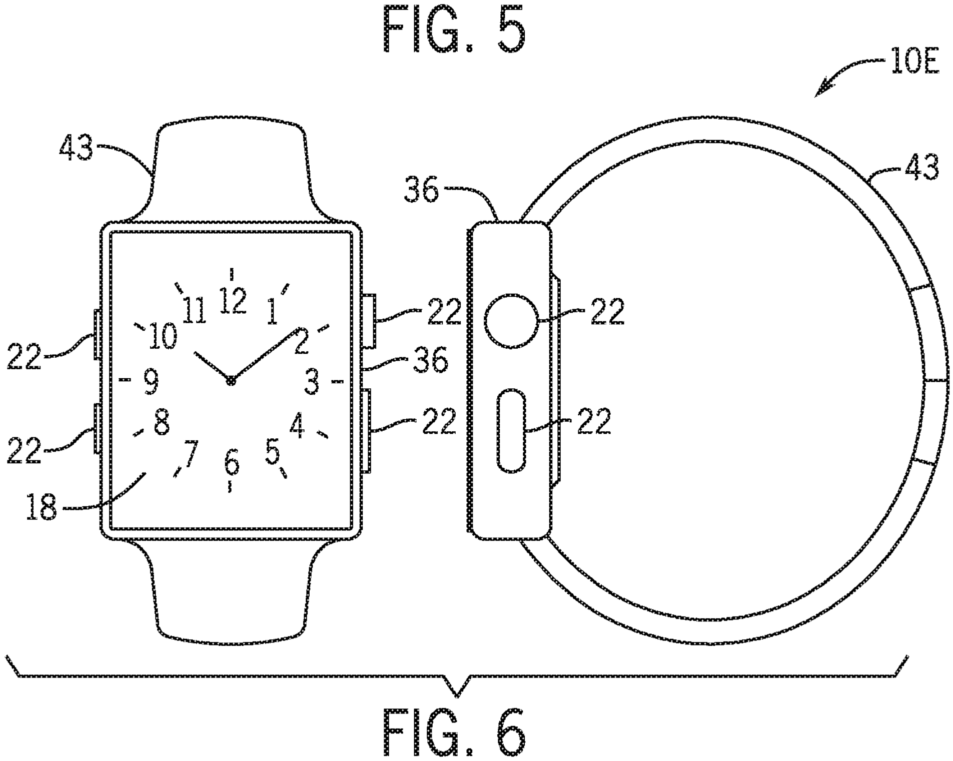
FIG. 6 is a front view and side view of a wearable electronic device representing another embodiment of the electronic device of FIG. 1.

Before discussing the media content publishing system in greater detail, electronic devices which may receive media content (e.g., articles and issues) are discussed first. As an example, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12, a local memory 14, a main memory storage device 16, an electronic display 18, input structures 22, an input/output (I/O) interface 24, a network interface 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application program specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. For example, the processor core complex 12 may carry out instructions stored in the local memory 14 and/or the main memory storage device 16 to receive content from a publishing system to receive issues or articles as well as receive user input regarding which issues or articles to access. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application program interface, still images, or video content. The processor core complex 12 may supply at least some of the image frames. For example, the processor core complex 12 may supply image frames of media content, such as articles within issues provided by a media content distribution system. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), alternating current (AC) power lines, and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or application programs running on computer 10A. For example, a keyboard and/or touchpad may allow a user to navigate a user interface or application program interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal serial bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application program screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor) or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

As noted above, the present disclosure relates to a media content publishing system or platform that may be utilized to arrange articles (e.g., news articles, reviews, studies, research papers, commentary, opinion pieces, etc.) into issues and provide the issues to electronic devices, such as the electronic device 10. For example, an issue or an article may be presented via the electronic display 18 of the electronic device 10.

Figure 7:
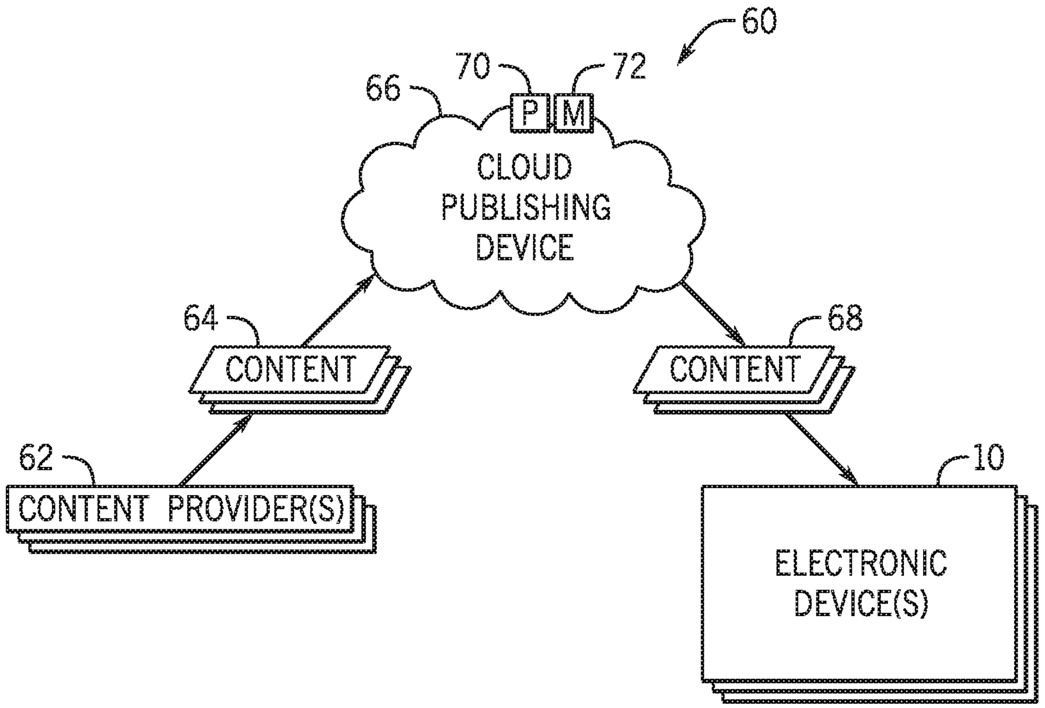
FIG. 7 is a flow diagram of a content distribution system, according to embodiments of the present disclosure.

With the foregoing in mind, FIG. 7 is a block diagram illustrating a content distribution system 60 for providing digital content to electronic devices. As illustrated, the content distribution system 60 includes content providers 62, content 64, a cloud publishing device 66, content 68, and electronic devices 10. As will be discussed below, the content 68 may differ from the content 64, for instance, due to changes the cloud publishing device 66 may make to the content 64.

The content providers 62 may include various sources and types of organizations. For example, as used herein, a content provider 62 generally refers to a person or organization that can provide content, such as articles, to the cloud publishing device 66. For instance, the content providers 62 may be individuals, companies, organizations, or other entities capable of providing articles, advertisements, or other forms of media content. Moreover, in FIG. 7, the content providers 62 may be representative of electronic devices through which a person or organization that makes content (e.g., content 64) interacts with the cloud publishing device 66.

As depicted in FIG. 7, the content providers 62 may provide content to the cloud publishing device 66. As discussed above, the content may be articles such, but not limited to, news articles, reviews, studies, research papers, commentary, and opinion pieces. For example, a content provider 62 may write an article and provide the article to the cloud publishing device 66 via the internet. More specifically, as discussed below, the content providers may access a system or platform implemented via the cloud publishing device 66 to provide (e.g., upload) the articles and information associated with the articles. Furthermore, it should also be noted that the content is not limited to written content. For example, the content may include images, video content, music, or other forms of non-written content.

The cloud publishing device 66 may receive the content 64 from the content providers 62 and ultimately provide the content 68 to electronic devices 10. The cloud publishing device 66 may be a computer-based system implemented via one or more computers, servers, or a combination thereof.

For example, the cloud publishing device 66 may include processing circuitry 70 and memory 72. The processing circuitry 70 may include any suitable data processing circuitry to perform operations discussed herein. For example, the processing circuitry 70 may include one or more microprocessors, one or more application program specific processors (ASICs), or one or more programmable logic devices (PLDs), such as field-programmable gate arrays (FPGAs). The memory 72 may include random access memory (RAM), read only memory (ROM), rewritable non-volatile memory such as flash memory, hard drives, optical discs, or the like. For example, the memory 72 may include instructions for a cloud publishing application that the processing circuitry 70 may execute to perform the operations of the cloud publishing device 66 discussed herein. For instance, the processing circuitry 70 may carry out instructions stored in the memory 72 to receive the content 64 from the content providers 62, arrange issues of articles included in the content 64, and provide content 68 to the electronic devices 10. Furthermore, the memory 72 may also store data to be processed by the processing circuitry 70.

As mentioned above, the cloud publishing device 66 may provide content 68 to the electronic devices 10. As discussed below, the content 68 may differ from the content 64 originally provided by the content providers 62. For example, the content 68 may be in the form of an issue that has articles, advertisements, or a combination thereof included in the content 64. Additionally, the cloud publishing device 66 may add metadata, pointers, or other data to the content 64 and included in the content 68 provided to the electronic devices 10. For instance, as elaborated upon below, metadata relating to an article or an issue in which an article is included may be included in the content 68.

Figure 8:
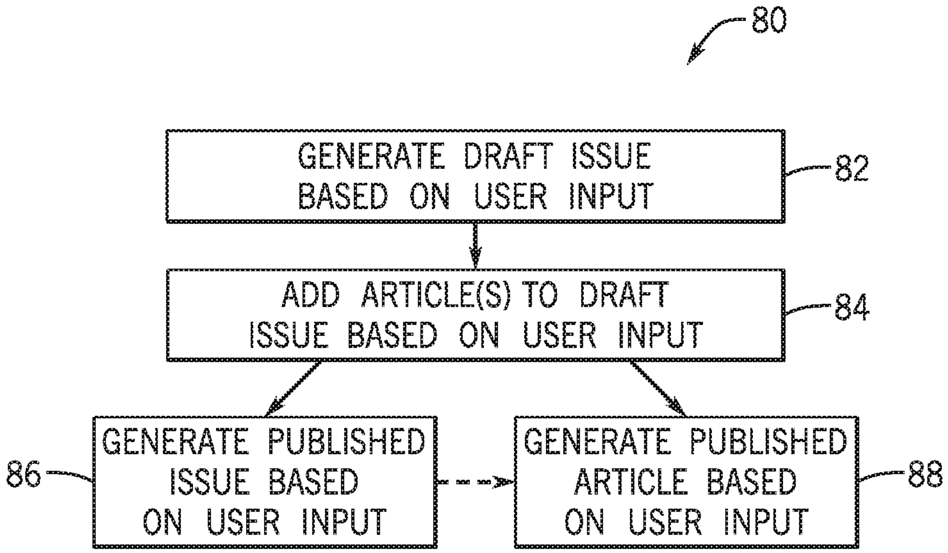
FIG. 8 illustrates a flow diagram for providing content via the cloud publishing device of FIG. 7, according to embodiments of the present disclosure.

As discussed herein, the cloud publishing device 66 generally operates by generating draft issues that can include various types of articles and publishing a public or published issue corresponding to a draft issue. For example, the cloud publishing device 66 may make available, via an application or otherwise make available through the internet, an issue and the content included therein. Keeping this and the discussion of FIG. 7 in mind, FIG. 8 is a flow diagram of a process for providing content via the cloud publishing device 66. The process 80 may be implemented in the form of an application program that includes instructions that are executed by at least one suitable processor of a computer system, such as the processing circuitry of the cloud publishing device 66. The illustrated process 80 is merely provided as an example, and in other embodiments, certain illustrated steps of the process 80 may be performed in other orders, skipped, or repeated, according to embodiments of the present disclosure. As discussed below, the process 80 generally includes generating a draft issue based on user input (e.g., process block 82), adding one or more articles to a draft issue based on user input (e.g., process block 84), generating a published issue based on user input (e.g., process block 86), and generating published articles based on user input (e.g., process block 88).

At process block 82, the processing circuitry 70 may generate a draft issue based on user input. For instance, content providers 62 may access (e.g., via the internet) an application or platform provided by the cloud publishing device 66 and submit a request to create a new issue. In response to such input, the processing circuitry 70 may generate a draft issue.

Figure 9:
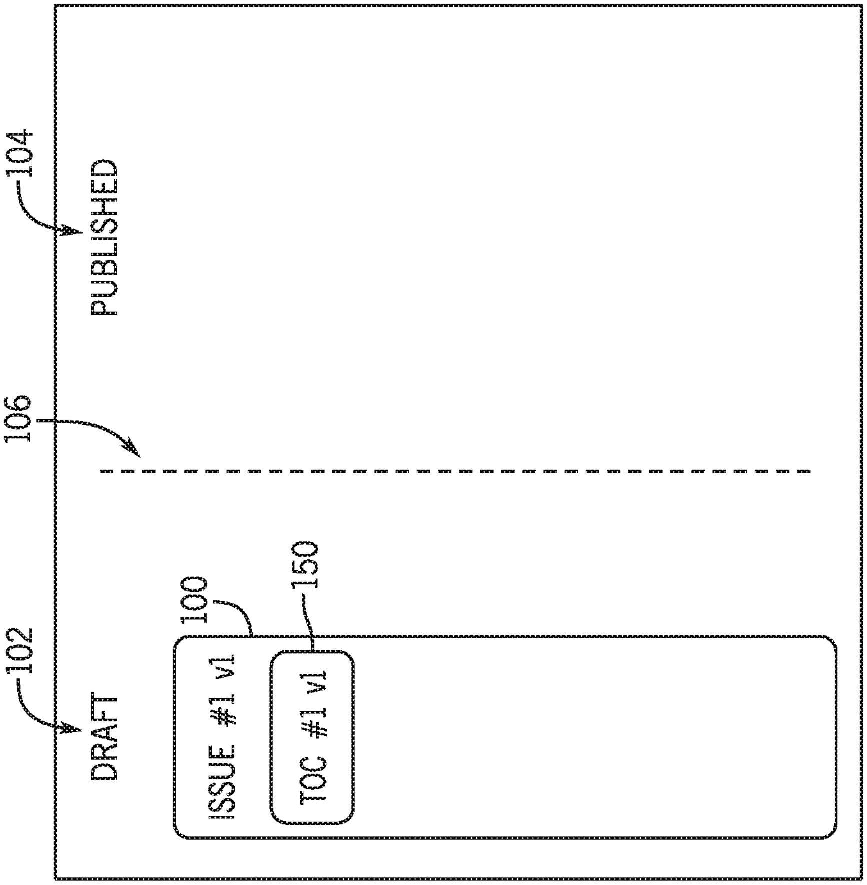
FIG. 9 is a block diagram a draft issue, according to embodiments of the present disclosure.

To help elaborate on the discussion of the process 80, FIG. 9 illustrates a block diagram that includes a draft issue 100. In particular, FIG. 9 includes a draft column 102 and published column 104 separated by a line 106. Items included in the draft column 102 (e.g., to the left of the line 106) are draft items, and items included in the published column 104 are published items. Upon receiving user input to make a new issue, the cloud publishing device 66 may generate the draft issue 100, which may be assigned an issue number (e.g., "Issue #1") and a version number (e.g., "v1"). Before the draft issue 100 is published, the draft issue 100 and content included within the draft issue 100 may not be publically available. In other words, as will be discussed below, unless content (e.g., issues or articles) included in the published column 104 corresponds to content within the draft column 102 (e.g., the draft issue 100), the content may not be made available to the public (e.g., distributed publically via the internet).

Figure 10:
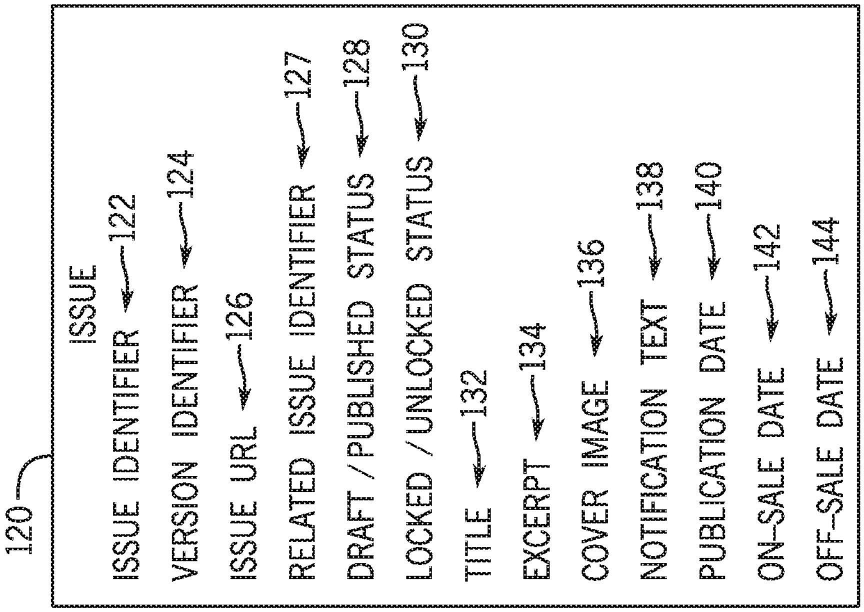
FIG. 10 is a block diagram of an issue, according to embodiments of the present disclosure.

Issues, such as the draft issue 100 and published issues discussed below, may include various types of data or metadata. For example, in one embodiment, an issue may be a programming object that includes other objects, attributes, or other types of data or metadata. With this in mind, FIG. 10 illustrates a block diagram of an embodiment of an issue 120, such as the draft issue 100 of FIG. 9, which includes various types of data. The issue 120 may include an issue identifier 122, which may provide a unique designation for the issue 120. In other words, the issue identifier 122 may indicate which particular issue the issue 120 is. A version identifier 124 may identify which version of an issue the issue 120 is. For example, as discussed below, upon changes being made to an issue, the version of the article may be updated. An issue uniform resource locator ("URL") 126 may designate a web address indicating where the issue 120 is located. For instance, the issue URL 126 may be indicative of an internet webpage. Another example of data that may be included in the issue 120 is a related issue identifier 127, which may identify other issues that are related to the issue 120. As discussed below, published issues may be generated from draft issues. The related issue identifier 127 of a published issue may identify the draft issue from which the published issue was generated. Moreover, the related issue identifier 127 of a draft issue may identify published issues generated from the draft issue. The issue 120 may also include a draft/published status indicator 128 that indicates whether the issue 120 is a draft or has been published. A locked/unlocked status indicator 130 may indicate whether or not the issue is locked from being edited. For instance, as discussed below, once an issue is published, a draft issue corresponding to a published issue may be locked from being edited. The issue 120 may also include a title indicator 132, which indicates the title of the issue 120, an excerpt 134 that may include other text associated with the issue (e.g., a description of what is discussed in the issue), and a cover image 136, which is the cover image for the issue 120.

Other data associated with the issue 120 may include notification text 138, a publication date 140, an on-sale date 142, and off-sale date 144. The notification text 138, for example, may be text provided to the electronic devices 10 when the issue 120 is published or otherwise becomes publically available. The publication date 140 is the date the issue 120 will be made publically available via the cloud publishing device 66. For instance, the cloud publishing device 66 may enable the electronic devices 10 to access the issue 120 via a platform or application. The on-sale date 142 and off-sale date 144 respectively refer to the date the issue 120 will be offered for the sale and the date the issue 120 will no longer be offered for sale. The on-sale date 142 may differ from the publication date 140. For example, an issue may be offered for sale prior to the issue being published (e.g., a pre-sale).

It should be noted that one or more of the data items discussed herein with respect to issues and article may take different forms in other embodiments. For example, rather than include the data itself, the issue 120 and articles included in the issue may include data pointers that provide a reference to a location in memory (e.g., the memory 72 of the cloud publishing device 66) where a corresponding item is stored. For instance, the cover image for an issue may be stored on the memory 72, and the cover image 136 of the issue 120 may include a data pointer providing the location of such an image stored in the memory 72.

Returning to FIG. 9, the draft issue 100 may also include a draft table of contents 150, which may be assigned a table of contents number (e.g., "TOC #1") and a version number (e.g., "v1"), which correspond to data included in the draft table of contents 150. It should be noted that tables of contents, such as the draft table of contents 150 may be defined as a particular type of article. For instance, an issue, such as the issue 120, may be a collection of articles. The articles may include tables of contents, articles (e.g., news articles, reviews, studies, research papers, commentary, opinion pieces, etc.), and advertisements.

Figure 11:
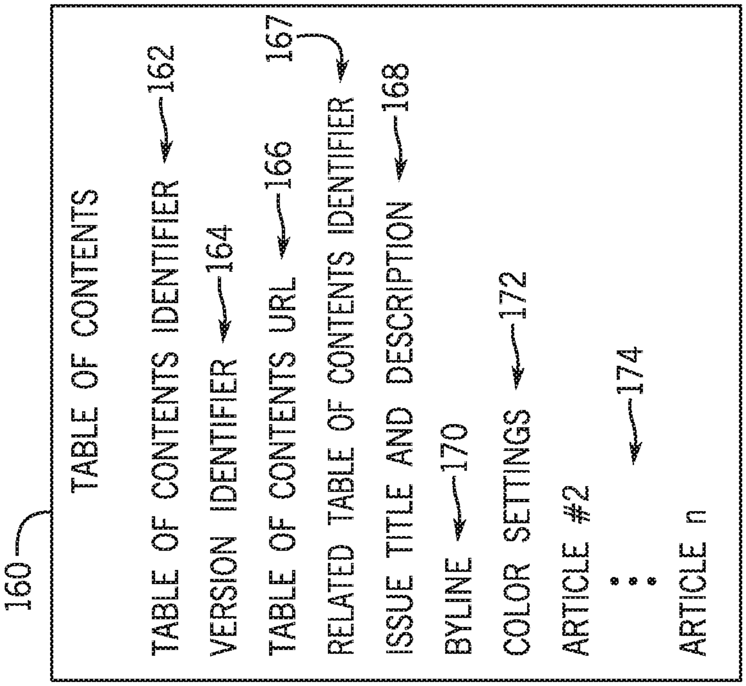
FIG. 11 illustrates a block diagram of a table of contents, according to embodiments of the present disclosure.

Tables of contents, such as the draft table of contents 150 as well as tables of contents included in published issues may include various forms of data. To help illustrate, FIG. 11 shows a block diagram of a table of contents 160. A table of contents identifier 162 may indicate which table of contents a particular table of contents is, and the version identifier 164 may indicate which version of the table of contents 160 the table of contents 160 is. For example, as articles are added to an issue, the cloud publishing device 66 may update the table of contents 160 to include information about the articles and modify the version identifier 164 to indicate that a change to the table of contents 160 has occurred. The table of contents 160 may also include a table of contents URL 166, which indicates a location of the table of contents 160. Furthermore, the table of contents 160 may include a related table of contents identifier 167, which may identify another table of contents that is related to the table of contents 160. For example, a table of contents included in a published issue may be generated based on a table of contents included in a draft issue. The table of contents of the published issue may include a related table of contents identifier 167 that identifies the table of contents included in the draft issue. Likewise, the table of contents of a draft issue may include a related table of contents identifier 167 that identifies the table of contents included in the published issue generated from the draft issue.

The table of contents 160 may also include data pertaining to how the table of contents 160 appears or items included in the table of contents 160, for instance, when provided to and displayed by the electronic devices 10. An issue title and description 168 may include information such as the title of the issue 120 the table of contents 160 is included in as well as a description of the issue. Among other things, a description may describe a theme of an issue or topics discussed within an issue. Furthermore, the table of contents 160 may include one or more bylines 170 that may be associated with articles included in an issue. The table of contents 160 may also include color settings data 172 indicative of colors associated with the table of contents 160. For example, the table of contents 160 may include a background color, and one or more colors associated with text included in the table of contents, such as the issue title and description 168 and bylines 170.

Furthermore, the table of contents 160 may include articles 174. For example, the table of contents 160 may include the one or more articles included in an issue or data representative of the articles that are included within the issue. As discussed above, one or more types of data included in issues and/or articles may include pointers to locations of where data is stored. As tables of contents may be articles, tables of contents may also include pointers. For example, rather than include text of an article, the table of contents 160 may include a pointer to a location within the memory 72 that includes the text of the article.

Returning to FIG. 8 and the discussion of the process 80, at process block 84, the cloud publishing device 66 may add one or more articles to the draft issue 100 based on user input. For example, a user (e.g., a content provider 62) may interact with an application or platform provide by the cloud publishing device 66 to indicate which articles the user wants an issue to include. In response to such user input, the cloud publishing device 66 may add the indicated article(s) to the draft issue 100.

Figure 12:
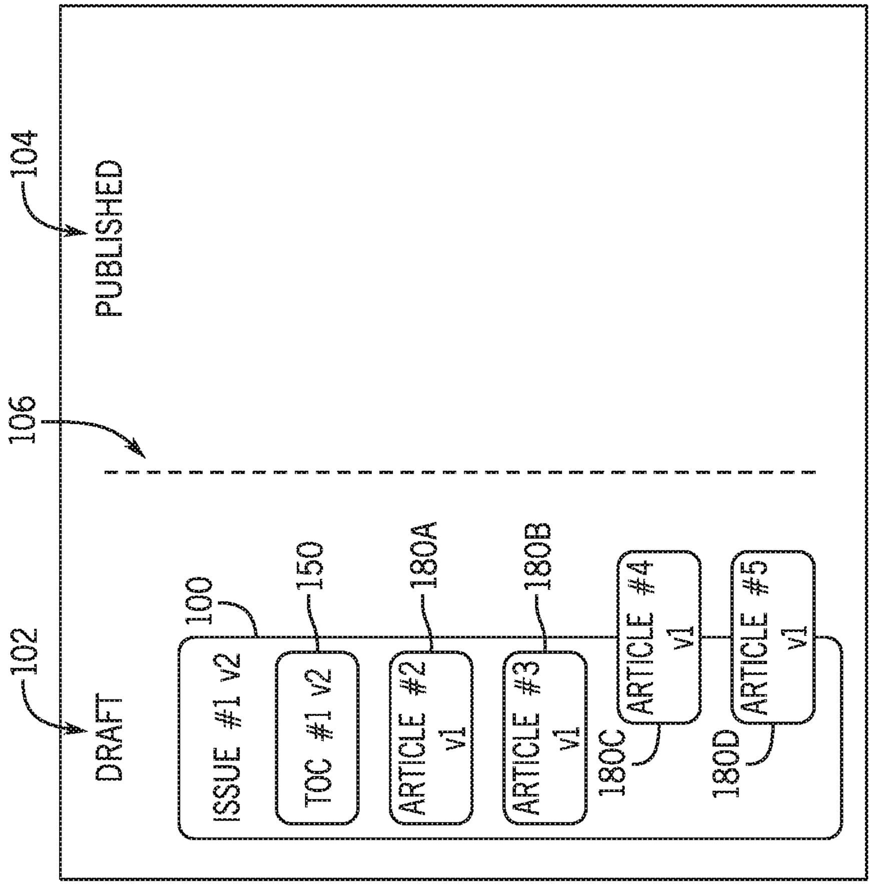
FIG. 12 is a block diagram of a draft issue that includes draft articles, according to embodiments of the present disclosure.

With this in mind, FIG. 12 depicts a block diagram of the draft issue 100 to which the cloud publishing device 66 has added draft articles 180. As noted above, the draft table of contents 150 may be classified as an article. With that in mind, the draft articles 180 of FIG. 12 generally refer to advertisements as well as content that may more commonly be referred to an article, such as news items, reviews, studies, research papers, commentary, opinion pieces, and the like.

The draft articles 180 may include issue-specific articles and issue-independent articles. As discussed herein, an issue-specific article refers to an article that is specific to an issue. In other words, an issue-specific article is not published outside of an issue. Issue-independent articles are articles that may be published outside of an issue, published outside of an issue and inside an issue, or published in more than one issue. In the illustrated embodiment, draft articles 180A, 180B are issue-specific articles. For example, as depicted in FIG. 12, the draft articles 180A, 180B are included completely within the bounds of the draft issue 100. Draft articles 180C, 180D, which are depicted partially within and outside the draft issue 100, are issue-independent articles. Furthermore, it should be noted that multiple articles may exist for an issue-independent article. For instance, for an issue-independent article that is included both inside and outside an issue, an article with an article identifier may be included inside the issue, while another article with a different article identifier may exist only outside of the issue (e.g., an individually-published article or an article published in another issue). Each of these articles may include linking data that indicates the particular articles relationship to the other article.

Figure 13:
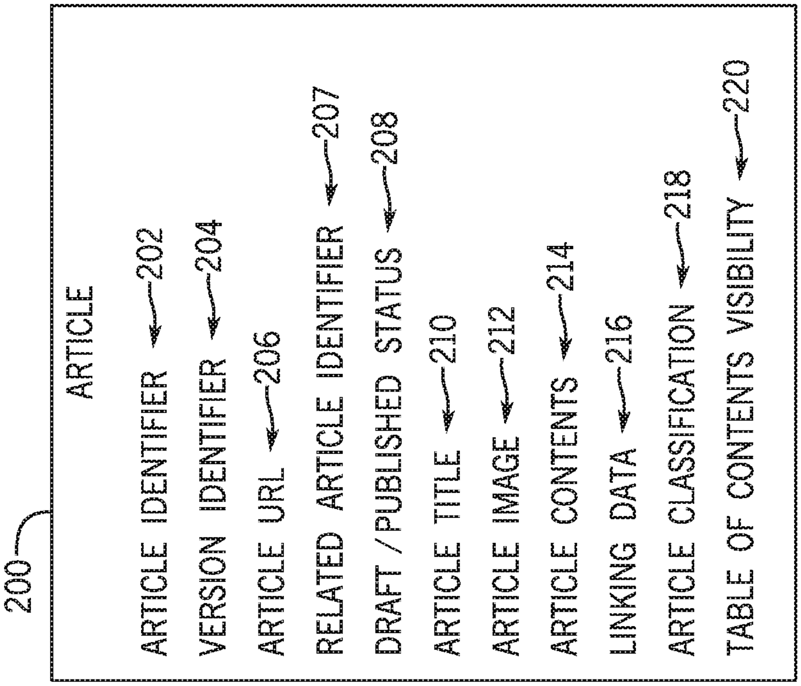
FIG. 13 is a block diagram of an article, according to embodiments of the present disclosure.

Articles, such as the draft articles 180 and published articles (discussed below) may include various types of data. For instance, articles may be defined as objects that include various attributes or other forms of data. To help illustrate, FIG. 13 depicts a block diagram of an article 200. As depicted, the article 200 may include an article identifier 202 that indicates which article the article 200 is. The article 200 may also include a version identifier 204, which may indicates which version of the article 200 the article 200 is. For instance, as discussed below, an article may be edited, and the cloud publishing device 66 may assign a different version identifier 204, for example, to indicate that the article has been modified. Additionally, the article 200 may include an article URL 206 that indicates a location of the article 200. Furthermore, the article 200 may also include a draft/published status indicator 208 that indicates whether the article has been published.

Articles may also include data pertaining to content included within the articles. For example, the article 200 may include a title 210, image data 212, and content data 214. The image data 212 refers to image data that may be included in the article, such as photographs, other images, video, and the like. The content data 214 generally refers to other content that may be included in an article, such as text included within the article 200 or music content. As noted above, in some cases, articles such as the article 200 may include pointers to a storage location of data instead of included the data itself. For example, in some embodiments, the article 200 may include pointers to locations within the memory 72 of the cloud publishing device 66 where data associated with the article 200, such as the image data 212 and the content data 214 is stored.

Furthermore, the article 200 may include a related article identifier 207 that identifies another article that is related to the article 200. For example, if the article 200 is a published article, the related article identifier 207 of the article 200 may indicate a draft issue from which the article 200 was generated. As another example, if the article 200 is a draft article, the related article identifier 207 may indicate a published article that was generated based on the article 200. Additionally, the article 200 may include several related article identifiers 207 that each identify a related article. For instance, multiple published articles may be generated from a single draft article, in which case the draft article may include related article identifiers 207 for each of the published articles generated from the draft article. Linking data 216 may include the related article identifiers 207 and may also indicate a particular relationship between two articles. As such, the related article identifiers 207 and/or linking data 216 may define a relationship between the article 200 and other articles. For example, related article identifiers 207 and/or the linking data 216 may be utilized to indicate that two articles are related to one another. For instance, for an issue-independent article, which may be included inside of an issue and outside of an issue (e.g., one article with one article identifier 202 and another article having a different article identifier 202 but generally the same contents), a related article identifier 207 and/or the linking data 216 may indicate that an article inside an issue is related to an article outside of the issue.

The article 200 may also include an article classification 218. Among other things, the article 200 may be classified as a featured article, regular article, or advertisement. As discussed below, how an article is classified can be utilized in determining an order of articles within a table of contents, such as the draft table of contents 150. Additionally, the article 200 may include a table of contents visibility status 220, which may define whether or not the article 200 is included in a table of contents for an issue that includes the article 200.

As mentioned above, when an issue is edited, tables of contents may be updated. For example, when the draft articles 180 are added to the draft issue 100, the cloud publishing device 66 may update the table of contents 160 to reflect that the draft articles 180 are included in the draft issue 100 and may change the version identifier 164 of the draft table of contents 150. For instance, in FIG. 12, the draft table of contents 150 is the second version (as indicated by "v2").

Returning to the discussion of the process 80 of FIG. 8, at process block 86, the cloud publishing device 66 may generate a published issue based on user input. For instance, in an application or platform the cloud publishing device may provide to the content providers 62, the content providers 62 may provide input to publish a draft article. In response to such an input, the cloud publishing device 66 may generate a published issue.

Making a draft issue or the contents (e.g., articles) of a draft issue publically available via an electronic medium comes presents challenges that do not exist with traditional printed media. For example, once a newspaper is printed, it can be delivered to people to be read, and the content printed in the newspaper can no longer be edited by the printer of the newspaper. However, that is not the case for digital content. For example, if a published article were to merely include the same contents as a draft article, editing the contents of the draft article would cause the published contents to also be altered, which may be undesirable. For instance, a version of an article within an issue may be made publically available while the article is being redacted, which may lead to incomplete or incorrect content to be provided to the electronic devices 10. As discussed below, the present techniques enable distributed content to be edited without modifying the distributed content. That is, one version of an article can be edited without a published version of the article also being edited.

Figure 14:
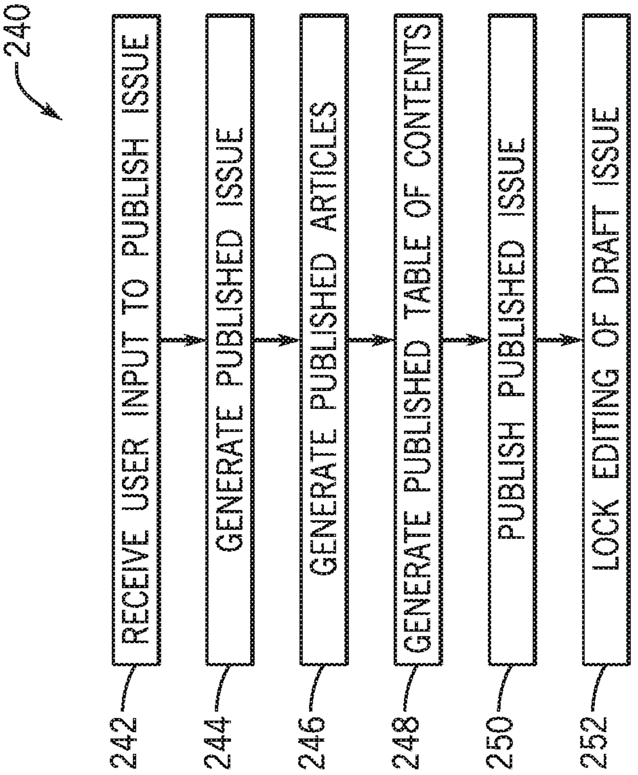
FIG. 14 illustrates a flow diagram of a process for publishing an issue, according to embodiments of the present disclosure.

With this in mind, FIG. 14 is a flow diagram of a process 240 for publishing a published issue. In other words, the process 240 relates to generating a published version of the draft issue 100. The process 240 may be implemented in the form of an application program that includes instructions that are executed by at least one suitable processor of a computer system, such as the processing circuitry 70 of the cloud publishing device 66. The illustrated process 240 is merely provided as an example, and in other embodiments, certain illustrated steps of the process 240 may be performed in other orders, skipped, or repeated, according to embodiments of the present disclosure. As discussed below, the process 240 generally includes receiving user input to publish an issue (e.g., process block 242), generating a published issue (e.g., process block 244), generating published articles (e.g., process block 246), generating a published table of contents (e.g., process block 248), publishing the published issue (e.g., process block 250), and locking the ability to edit a draft issue (e.g., process block 252).

At process block 242, cloud publishing device 66 may receive user input to publish an issue. For instance, as discussed above, the cloud publishing device 66 may provide an application or platform to the content providers 62 via which the content providers 62 may be able to indicate that a draft issue (e.g., draft issue 100) should be published.

In response to receiving the user input to publish the draft issue, at process block 244 the cloud publishing device 66 may generate a published issue. Published issues are not necessarily the same as draft issues. For example, while published issues may generally include content that appears to be the same as the content included in a draft article, the underlying data may differ. In other words, draft issues and published issues are separate from one another and may co-exist. Thus, a published issue that is generated may not include any articles. Rather, the data to establish another issue (e.g., a published issue) may be generated.

At process block 246, the cloud publishing device 66 may generate published articles and include the published articles in a published issue. More specifically, published articles may be different from, yet correspond to, draft articles included in a draft issue. For example, a published article may be an object separate from a draft object. In other words, a draft article and a published article that are associated with the same content (e.g., text information, images, etc.) may be two separate pieces of data distinct from one another. For instance, a draft article may include one article identifier, while a corresponding published article may be associated with a different identifier. Moreover, other data, such as the article URL 206, may be different between a draft article and a corresponding published article. In some cases, the published articles may be the same as the draft article. For example, a published article may be a public version of a draft article, and the published article and draft article may share the same article identifier 202. Additionally, in such a case, a published article may be a draft article in which the draft/published status indicator 128 is changed from "draft" to "published" to indicate that the article has been published.

At process block 248, the cloud publishing device 66 may generate a published table of contents. A published table of contents may generally correspond to a draft table of contents. For example, articles included in a published table of contents may be published articles that correspond to draft articles listed in a draft table of contents. In particular, a published table of contents may be similar to a corresponding draft table of contents but differ at least because the published table of contents may include or be associated with different article identifiers 202 than a draft issue. In other words, while a draft table of contents may include data related to draft articles, a published table of contents may include data related to published articles. However, in other embodiments, the published table of contents may be an updated version of a previously published table of contents. For example, if the contents (e.g., articles) of a previously published issue are modified, a new published table of contents for the issue may be generated by updating an earlier version of the published table of contents of the issue.

At process block 250, the cloud publishing device 66 may publish a published issue. For example, the cloud publishing device 66 may provide a published issue via the internet to the electronic devices 10, and users of the electronic devices 10 may access the published issue. Furthermore, at process block 252 the cloud publishing device 66 may lock editing of a draft issue (e.g., the draft issue 100). That is the, the cloud publishing device 66 may prevent content providers 62 from being able to edit the draft issue 100 upon publication of a corresponding published issue.

Figure 15:
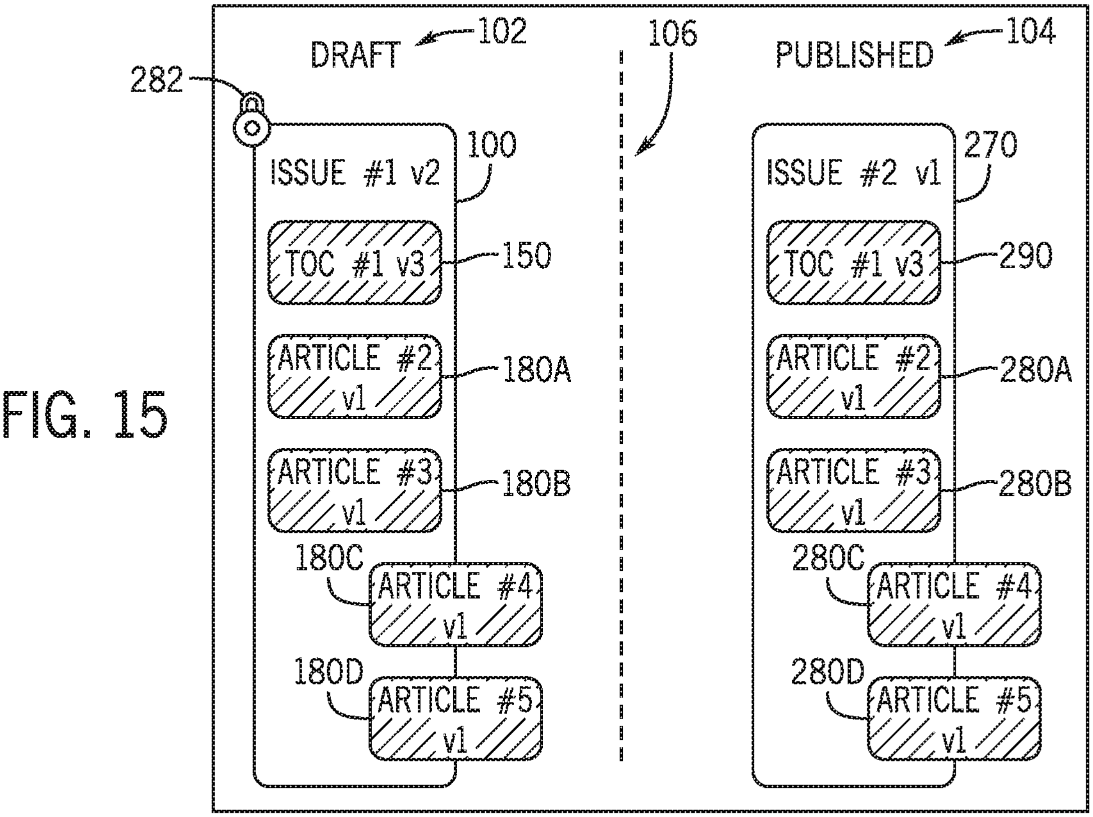
FIG. 15 is a block diagram of a draft issue and a corresponding published issue, according to embodiments of the present disclosure.

To help elaborate on published issues, FIG. 15 is provided. In particular, FIG. 15 provides a block diagram that includes the draft issue 100 and a corresponding published issue 270. As illustrated, the published issue 270 includes published articles 280. Additionally, the draft articles 180 and published articles 280 include hatching to illustrate that the draft articles 180 and published articles 280 are published. More specifically, draft articles 180 are not publically available, but rather, the content to be consumed (e.g., news content, video content, etc.) that is associated with the draft articles 180 is available because, as discussed above, the published articles 280 include corresponding content. Moreover, as noted above, the draft articles 180 and published articles 280 may be the same. For example, published article 280C may be a public version of draft article 180C, and the published article 280C and draft article 180C may share the same article identifier 202. Additionally, in such a case, a published article may be a draft article in which the draft/published status indicator 128 is changed from "draft" to "published" to indicate that the article has been published. Furthermore, the lock symbol 282 indicates that the draft issue 100 is locked from being edited.

As noted above, an issue identifier associated with the published issue 270 may differ from the issue identifier 122 associated with the draft issue 100. For instance, as illustrated the draft issue 100 is "Issue #1," while the published issue 270 is "Issue #2." Additionally, while the draft articles 180 and corresponding published articles 280 are depicted as having the same article numbers and version numbers, the draft articles 180 and published articles 280 are depicted in this manner to illustrate that the underlying content (e.g., text, images, video content, music, etc.) is the same. Furthermore, as discussed above, article identifiers 202 associated with a draft article (e.g., draft article 180A) and a corresponding published article (e.g., published article 280A) may have the same or different article identifiers 202.

As discussed above, a published table of contents 290 may be generated for the published issue 270. In particular, the published table of contents 290 may be generally similar to the draft table of contents 150 but be associated with different article identifiers 202 and/or article URLs 206 (e.g., article identifiers 202 and article URLs 206 of published articles 280). Furthermore, it should be noted that the draft table of contents 150 may also be updated. For example, the draft table of contents 150 may be modified to include article identifiers 202 and article URLs 206 of published articles 280. As such, in some cases, the draft table of contents 150 and the published table of contents 290 may be the same. Furthermore, as discussed above, a version number (e.g., associated with the version identifier 164) may be modified when a table of contents is modified. For instance, in the illustrated embodiment, the draft table of contents 150 may be updated to reflect that the draft table of contents 150 has been modified (e.g., change from "v2" to "v3").

Figure 16:
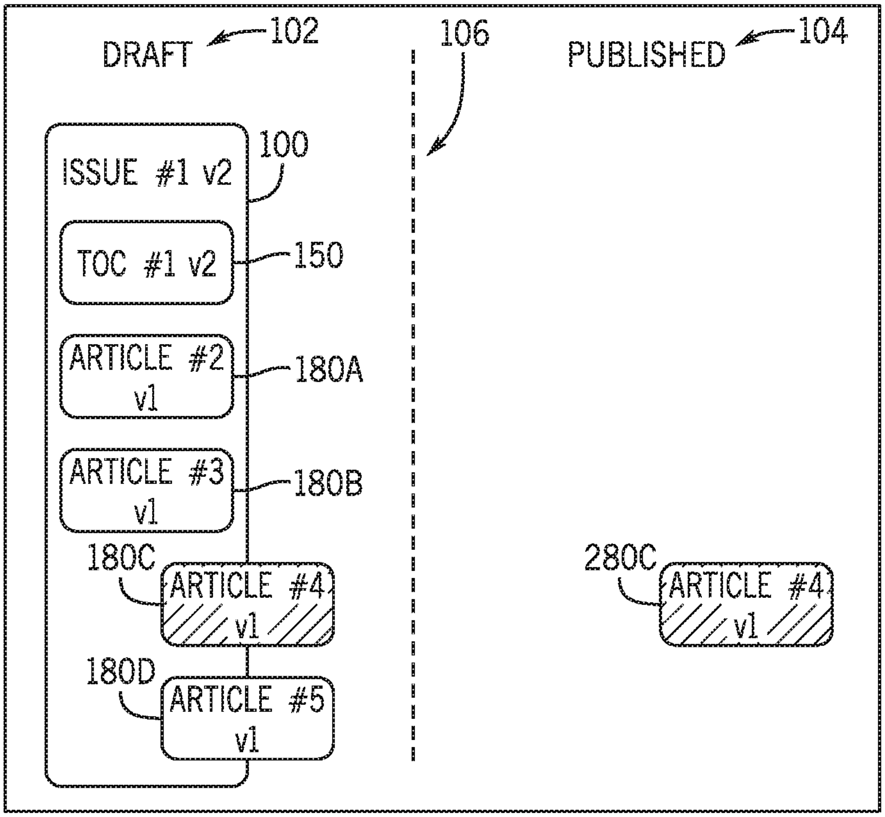
FIG. 16 illustrates a block diagram of a draft issue that includes an article that is published outside of an issue, according to embodiments of the present disclosure.

As discussed above, some articles may be issue-independent articles that may be published outside of an issue. Bearing this in mind, and returning to the discussion of FIG. 8 and the process 80, at process block 88, the cloud publishing device 66 may generate published article(s) based on user input. For example, a user may indicate a desire to publish an issue-independent article before an issue is made public via an application or platform provided via the cloud publishing device 66. In response, the cloud publishing device 66 may generate a published article, such as an issue-independent article that exists outside of an issue. The cloud publishing device may generate a published article (e.g., an issue-independent published article) in a manner generally similar to the published articles 280 discussed above with respect to FIG. 15. For example, FIG. 16 illustrates a block diagram that includes the draft issue 100 in which the draft article 180C has been published outside of the draft issue 100, as shown by published article 280C under the published column 104. In other words, one or more articles (e.g., draft article) included in a draft issue (e.g., draft issue 100) may be published before the issue as a whole is published.

Figure 17:
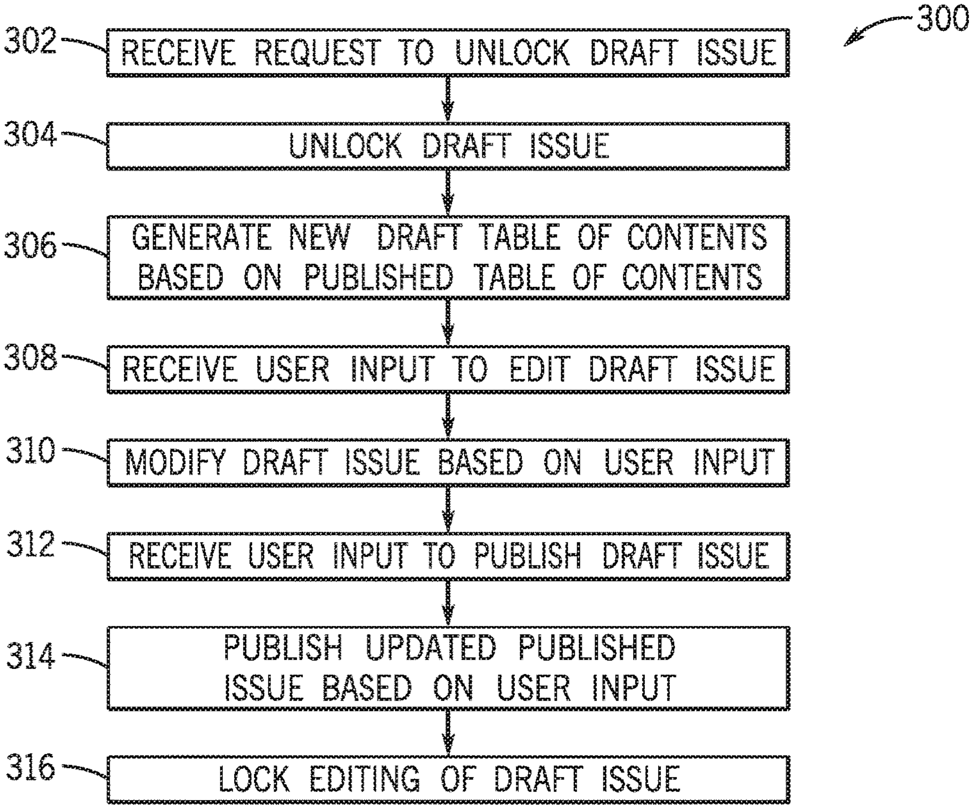
FIG. 17 illustrates a flow diagram of a process for modifying an issue, according to embodiments of the present disclosure.

The presently disclosed techniques also enable modifications to be made to issues or articles within issues after the issues and/or articles have been published. Keeping this in mind, FIG. 17 is a flow diagram of a process 300 for modifying an issue, for instance, after the issue has been published. The process 300 may be implemented in the form of an application program that includes instructions that are executed by at least one suitable processor of a computer system, such as the processing circuitry 70 of the cloud publishing device 66. The illustrated process 300 is merely provided as an example, and in other embodiments, certain illustrated steps of the process 300 may be performed in other orders, skipped, or repeated, according to embodiments of the present disclosure. As discussed below, the process 300 generally includes receiving user input to edit an issue (e.g., process block 302), unlocking a draft issue for editing (e.g., process block 304), generating a new draft table of contents based on a published table of contents (e.g., process block 306), receiving user input to modify the draft issue (e.g., process block 308), modifying the draft issue based on the user input (e.g., process block 310), receiving user input to publish an updated published issue (e.g., process block 312), publishing an updated published issue based on user input (e.g., process block 314), and locking the ability to edit the draft issue (e.g., process block 316).

At process block 302, the cloud publishing device 66 may receive user input requesting to unlock a draft issue, such as the draft issue 100. For example, a content provider 62 may want to edit an issue after the issue has been published. In some embodiments, the cloud publishing device 66 may receive user data (e.g., username(s), IP addresse(s)) or security credentials (e.g., password(s)) from the person or entity requesting unlocking of the draft issue 100. For example, the memory 72 of the cloud publishing device 66 may include data indicating certain users that may access the draft issue 100 for editing.

In response to the user input, at process block 304, the cloud publishing device 66 may unlock the draft issue 100 for editing. Furthermore, in embodiments in which the cloud publishing device 66 utilizes user data and/or security credentials, the cloud publishing device 66 may determine whether the person or entity requesting that the draft issue 100 be unlocked for editing has permission to edit the draft issue 100 and unlock the draft issue 100 when the cloud publishing device 66 determines that the person or entity has permission to edit the draft issue 100.

Figure 18:
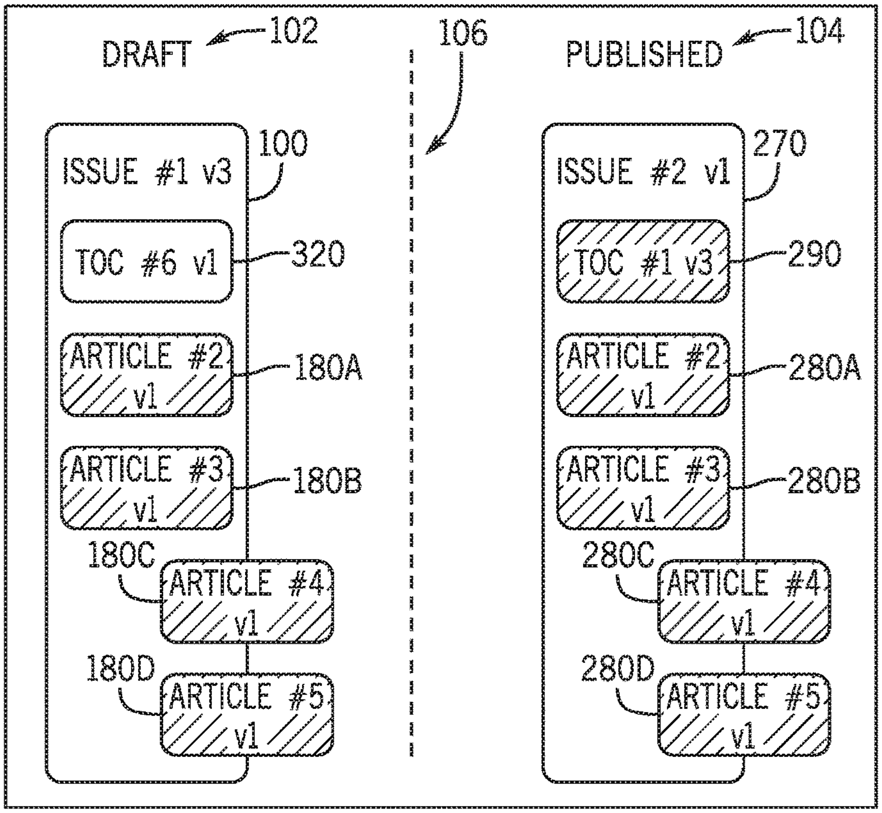
FIG. 18 illustrates a block diagram of a draft issue and published issue, according to embodiments of the present disclosure.

At process block 306, the cloud publishing device 66 may generate a new draft table of contents based on a published table of contents (e.g., published table of contents 290). To help illustrate, FIG. 18 includes a block diagram of the draft issue 100 and published issue 270 in which a new draft table of contents 320 has been generated, as indicated by the table of contents number (e.g., "TOC #6) differing from a previous table of contents number (e.g., "TOC #1," as shown in FIG. 15). More specifically, generating the new draft table of contents 320 may generally include copying the published table of contents 290 and modifying the table of contents identifier 162 of the new draft table of contents 320 to differ from the table of contents identifier 162 of the published issue 270. The new draft table of contents 320, as illustrated by the lack of hashing, is not publically available. Because the new table of contents 320 is different from the published table of contents 290 and not published, content providers may edit the new draft table of contents 320 without the publically available published table of contents 290 being modified. In other words, changes to a draft version of the table of contents may be made without causing changes to a publicly visible version of the table of contents. Furthermore, it should be noted that the lack of the lock symbol 282 indicates that the draft issue 100 is available to be edited. It should be noted that, in some embodiments, the new draft table of content 320 may be a previous version of a draft table of contents (e.g., draft table of contents 150) that is regenerated based on properties of a published table of contents (e.g., published table of contents 290).

In some embodiments, an entire new draft issue may be generated upon the draft issue 100 being unlocked for editing. For example, in some embodiments of issues, particularly issues with issue-independent articles, changes may have been made to articles outside of an issue. Thus, the cloud publishing device 66 may modify an original draft issue to include the publically available content (which may differ from content found in the draft issue). For instance, in a new draft issue, a new draft table of contents and new draft articles may be generated based on published content. Accordingly, by generating a new draft issue (or re-generating a draft issue), the cloud publishing device 66 may ensure that the most up-to-date content is provided to the content providers 62 for editing.

Figure 19:
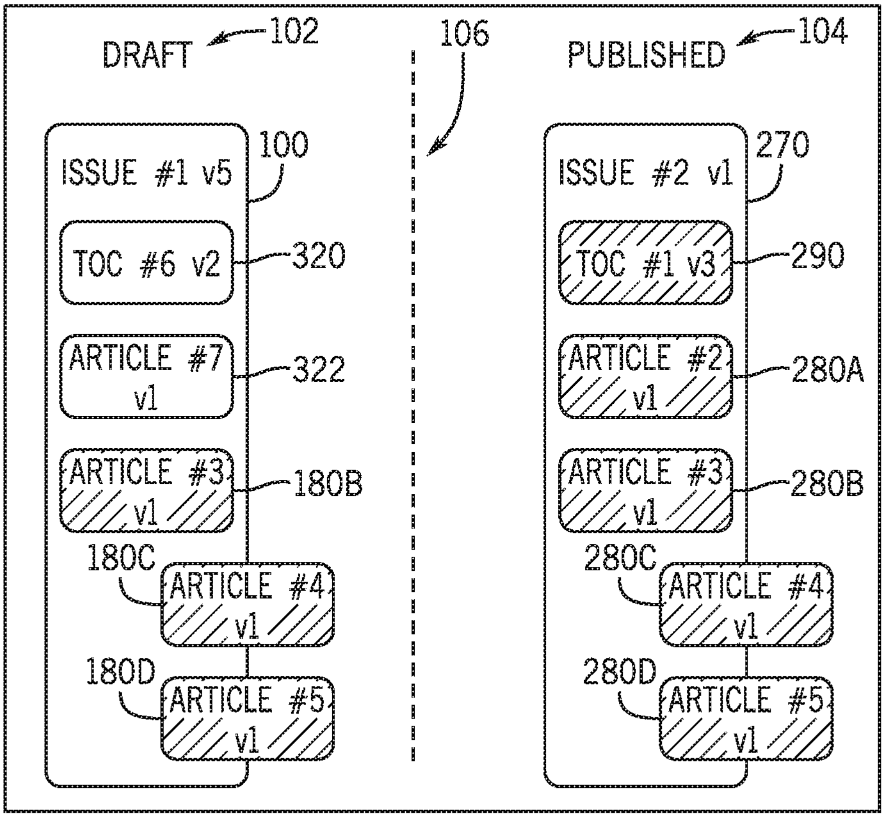
FIG. 19 illustrates a block diagram that includes a draft issue with a new draft article, according to embodiments of the present disclosure.

Turning back to FIG. 17, at process block 308, the cloud publishing device 66 may receive user input to edit the draft issue 100. As non-limiting examples, a content provider 62 may want to edit an article, replace an article, or remove an article. Indeed, as discussed below, more types of modifications may be made to an issue. Based on the user input, at process block 310, the cloud publishing device 66 may modify the draft issue. For instance, FIG. 19 illustrates a block diagram that includes the draft issue 100 with a new draft article 322. The new draft article 322 may be an edited version of the draft article 180A. For example, a content provider may have edited the draft article 180A to make redactions or corrections to the draft article 180A. As illustrated, the new draft article 322 may be assigned a different issue identifier 122 and not be publically available. As such, the new draft article 322 may not be available until the draft issue 100 is republished or the new draft article 322 is published (e.g., in embodiments in which a new draft article 322 is an issue-independent article). Enabling new or edited draft articles to be kept private during editing may be desirable, for example, to prevent public access to an article while the article is still being edited or before changes have been reviewed.

Returning to FIG. 17, at process block 312, the cloud publishing device 66 may receive user input to publish the draft issue 100. That is, the cloud publishing device 66 may receive user input to publish a draft issue that has been modified or otherwise edited. In response to such user input, at process block 314, the cloud publishing device 66 may generate and publish a published issue. Additionally, at process block 316, the cloud publishing device 66 may lock the draft issue 100 from being edited.

Figure 20:
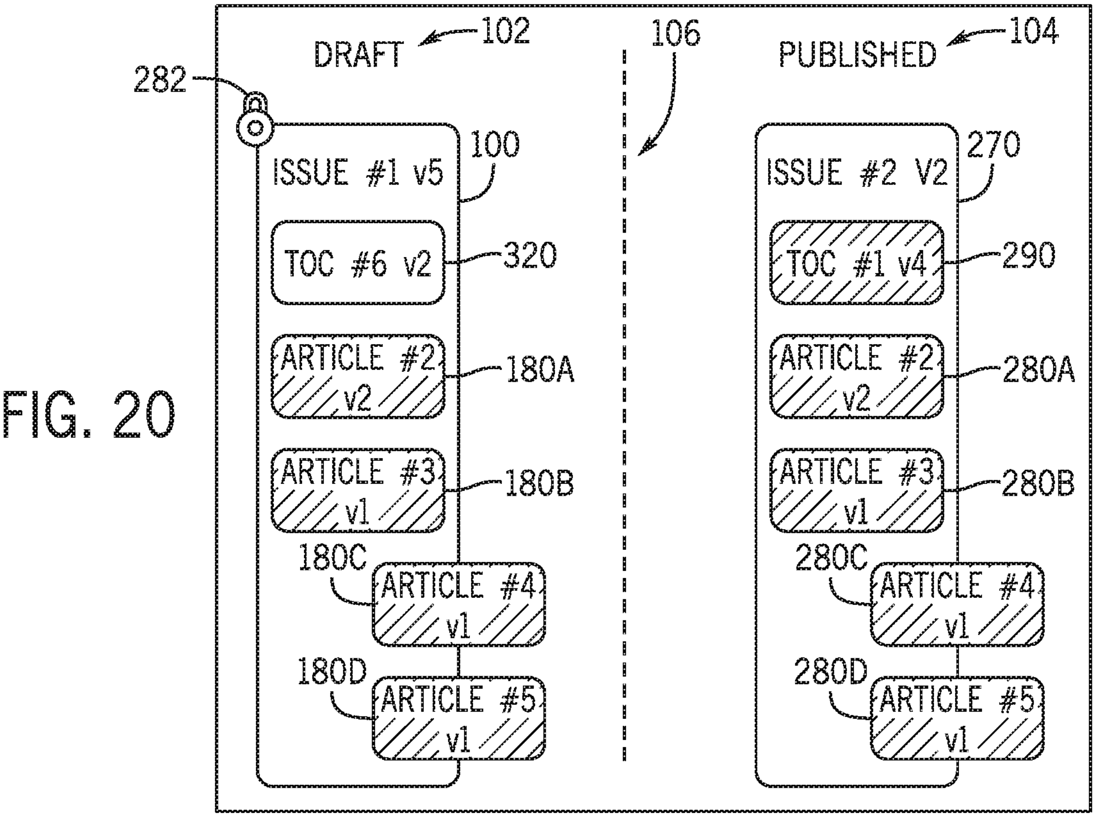
FIG. 20 illustrates a block diagram of a draft issue and a corresponding published issue generated upon republication of the draft issue, according to embodiments of the present disclosure.

To help illustrate, FIG. 20 depicts a block diagram in which the draft issue 100 has been republished, which resulted in the illustrated embodiment of the published issue 270. More specifically, the cloud publishing device 66 may modify the published article 280A to include the content included in the new draft article 322 of FIG. 19, which is illustrated as being another version (e.g., "v2") of the draft article 180A in FIG. 20. Such a change may be indicated by updating the contents of the published article 280A, including changing the version identifier 204. More specifically, the cloud publishing device 66 may have determined that the new draft article 322 and/or draft article 180A corresponds to the published article 280A (e.g., as indicated by one or more related article identifiers 207, the linking data 216, or data indicating a position of the new draft article 322 within the draft issue 100). The data of the draft issue 100 may be modified to reflect such a determination. Moreover, a new version of the published table of contents may be generated in the draft issue 100 and the published issue 270 in the manner discussed above. Furthermore, the draft issue 100 may be locked from being edited, as discussed above and indicated by the lock symbol 282 in FIG. 20.

In addition to enabling editing of articles within draft issues, the cloud publishing device 66 enables content providers 62 to have edits applied to issue-independent articles outside of an issue applied within an issue. In other words, changes made outside of issues to articles that exist inside of an issue and outside of an issue (e.g., published in an issue and either also published as an individual article or also published in at least one other issue) may also be applied to inside of an issue. With this in mind, FIG. 21 illustrates a flow diagram of a process 340 for updating a published issue based on a change made outside of the issue (e.g., outside of the published issue and a corresponding draft issue). The process 340 may be implemented in the form of an application program that includes instructions that are executed by at least one suitable processor of a computer system, such as the processing circuitry 70 of the cloud publishing device 66. The illustrated process 340 is merely provided as an example, and in other embodiments, certain illustrated steps of the process 340 may be performed in other orders, skipped, or repeated, according to embodiments of the present disclosure. As discussed below, the process 340 generally includes receiving a request to edit an article outside of an issue (e.g., process block 342), updating the article outside of the issue (e.g., process block 344), and updating a draft issue and a published issue (e.g., process block 346).

Figure 23:
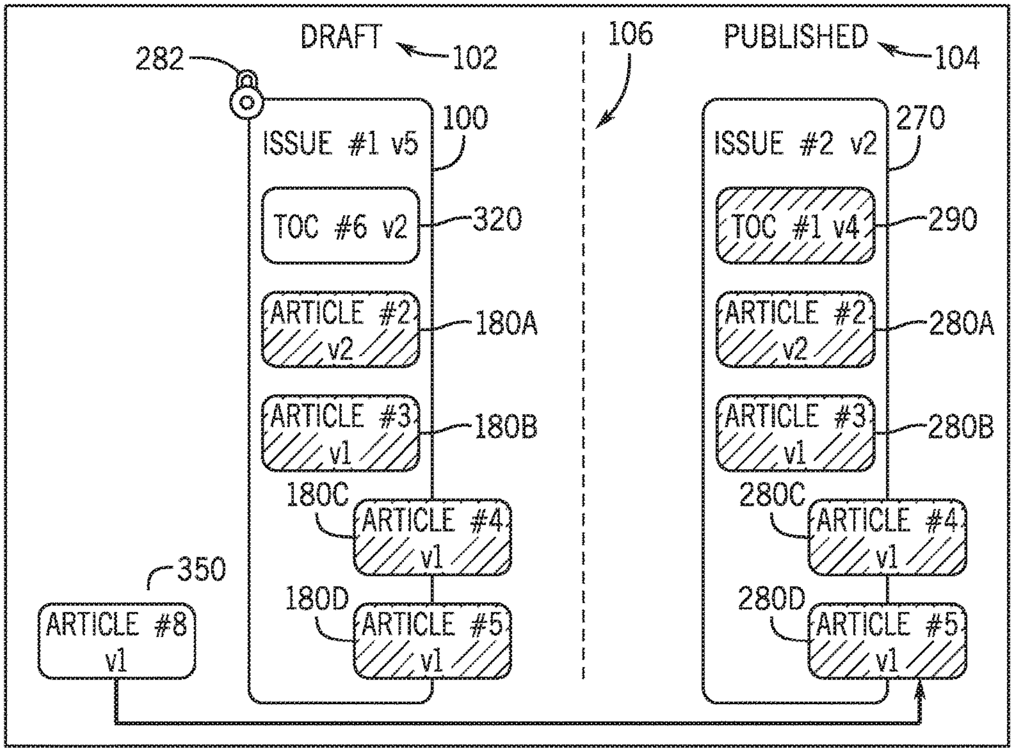
FIG. 23 illustrates a block diagram of the draft issue, published issue, and outside article of FIG. 22 indicating a relationship between the outside article and a published article of the published issue, according to embodiments of the present disclosure.

At process block 342, the cloud publishing device 66 may receive a request to edit an article outside of an issue. Additionally, at process block 344, the cloud publishing device 66 may update the article outside of the issue. FIG. 22 illustrates the draft issue 100, the published issue 270, and an outside article 350. The outside article 350 may be a new article or an edited version of a preexisting article. For example, the outside article 350 may be an edited draft article outside of an issue that corresponds to an article included in an issue. For instance, FIG. 23 illustrates the draft issue 100, the published issue 270, and that the outside article 350 is either related to or will replace published article 280D. For instance, once the outside article 350 is edited, the cloud publishing device 66 may determine that the outside article 350 is related to the published article 280D. More specifically, the outside article 350 and published article 280D may correspond to an issue-independent article.

Figure 24:
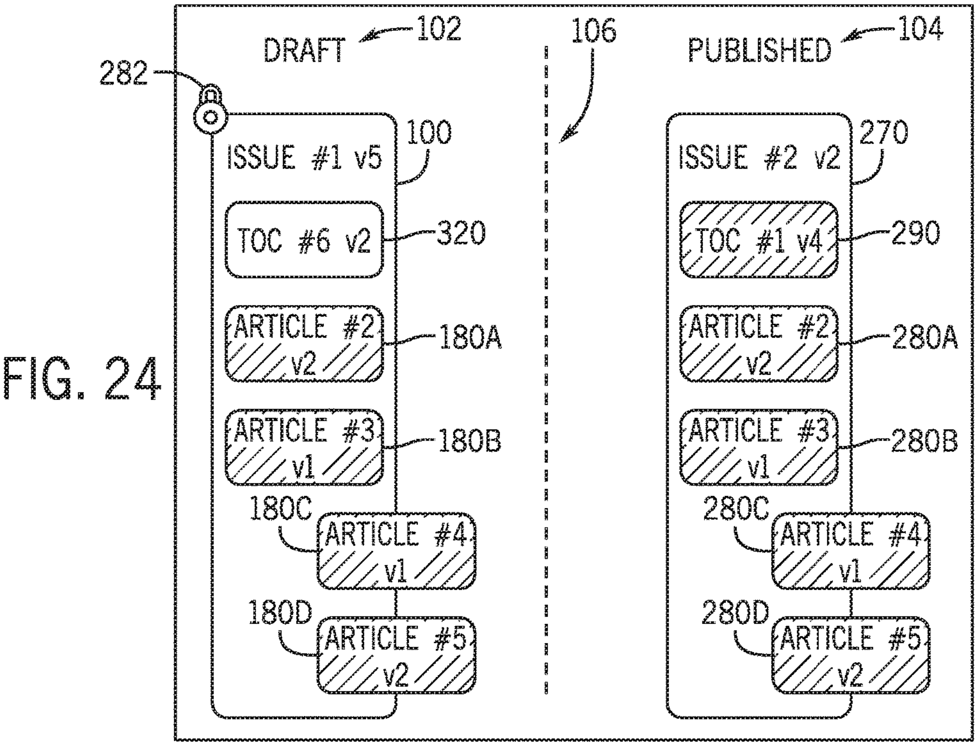
FIG. 24 illustrates a block diagram that includes the draft issue and published issue of FIG. 23 after the draft issue and published issue have been updated, according to embodiments of the present disclosure.

Returning to FIG. 21, at process block 346, the cloud publishing device 66 may update the draft issue 100 and the published issue 270 based on the outside article 350. More particularly, the draft article 180D and the published article 280D or data therein may be modified to reflect changes made to the outside article 350. Additionally, the version identifiers 204 of the draft article 180D and published article 280D may be updated. For example, FIG. 24 is a block diagram that includes the draft issue 100 and the published issue 270 after the draft issue 100 and published issue 270 have been updated. As illustrated, the version numbers for both the draft issue 100 and the published issue 270 have changed to "v2." In other words, if a user modifies the published article 280D (which may be the same article as the draft article 180D and include the same article identifier 202) to be the article outside article 350, the draft article 180D and published article 280D may be modified based on the outside article 350D as well as a draft version of the outside article 350D.

In addition to making changes by adding or editing articles, the cloud publishing device 66 enables articles within issues to be removed and deleted. As discussed below, removing an article refers to removing an article from an issue and does not include deleting the article. Deleting an article refers to deleting the article, for example, from the memory 72 of the cloud publishing device 66. In other words, an article removed from an issue may exist (e.g., still be stored in memory 72), while an article will no longer exist upon deletion. Furthermore, the cloud publishing device 66 may enable content providers 62 to cause a draft issue to reflect the most recent version of a published issue.

Figure 25:
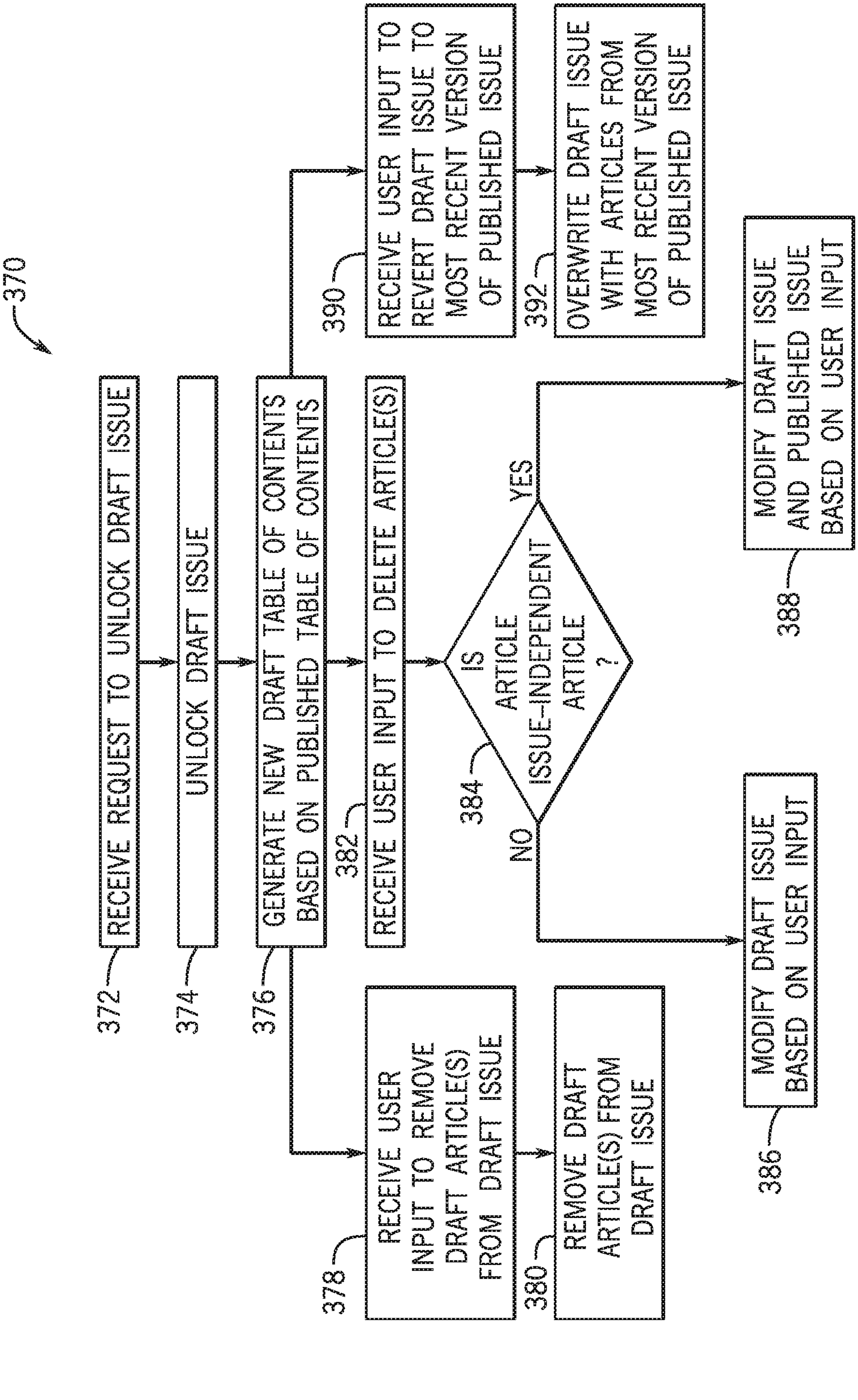
FIG. 25 is a flow diagram of a process for removing articles, deleting articles, and reverting a draft issue based on a most recent version of a published issue, according to embodiments of the present disclosure.

Keeping this in mind, FIG. 25 is a flow diagram of a process 370 for removing articles, deleting articles, and reverting a draft issue based on a most recent version of a published issue. The process 370 may be implemented in the form of an application program that includes instructions that are executed by at least one suitable processor of a computer system, such as the processing circuitry 70 of the cloud publishing device 66. The illustrated process 370 is merely provided as an example, and in other embodiments, certain illustrated steps of the process 370 may be performed in other orders, skipped, or repeated, according to embodiments of the present disclosure. As discussed below, the process 370 generally includes receiving a request to unlock a draft issue for editing (e.g., process block 372), unlocking the draft issue for editing (e.g., process block 374), and generating a new draft table of and contents based on a published table of contents (e.g., process block 376). When related to removing one or more articles from an issue, the process 370 may also include receiving user input to remove one or more articles from the draft issue (e.g., process block 378) and removing the article(s) from the draft issue (e.g., process block 380). When pertaining to deleting articles, the process 370 may also include receiving user input to delete one or more articles (e.g., process block 382), determining whether the article is an issue-independent article (decision block 384), and deleting the draft article and a corresponding published article when the article selected for deletion is not an issue-independent article (e.g., process block 386) or deleting the article, a corresponding article from a corresponding published issue, and one or more outside articles related to the article(s) selected for deletion (e.g., process block 388). Furthermore, when the process 370 relates to reverting a draft issue to a most recent published issue, the process 370 may also include receiving user input to revert a draft issue to a most recent published issue (e.g., process block 390), and overwriting the draft issue with articles from the most recent version of the published issue (e.g., process block 392).

At process block 372, the cloud publishing device 66 may receive user input requesting to unlock a draft issue, such as the draft issue 100. For example, a content provider 62 may want to edit an issue after the issue has been published. In some embodiments, the cloud publishing device 66 may receive user data (e.g., username(s), IP addresse(s)) or security credentials (e.g., password(s)) from the person or entity requesting unlocking of the draft issue 100. For example, the memory 72 of the cloud publishing device 66 may include data indicating certain users that may access the draft issue 100 for editing.

In response to the user input, at process block 374, the cloud publishing device 66 may unlock the draft issue 100 for editing. Furthermore, in embodiments in which the cloud publishing device 66 utilizes user data and/or security credentials, the cloud publishing device 66 may determine whether the person or entity requesting that the draft issue 100 be unlocked for editing has permission to edit the draft issue 100 and unlock the draft issue 100 when the cloud publishing device 66 determines that the person or entity has permission to edit the draft issue 100.

At process block 376, the cloud publishing device 66 may generate a new draft table of contents based on a published table of contents (e.g., published table of contents 290). For example, as discussed above with respect to FIG. 18, generating a new draft table of contents may generally include copying the published table of contents 290 and modifying the table of contents identifier 162 of the new draft table of contents (e.g., new draft table of contents 320) to differ from the table of contents identifier 162 of the published table of contents 290 of the published issue 270. As another example, generating a new draft table of contents may include regenerating an existing draft table of contents.

Figure 26:
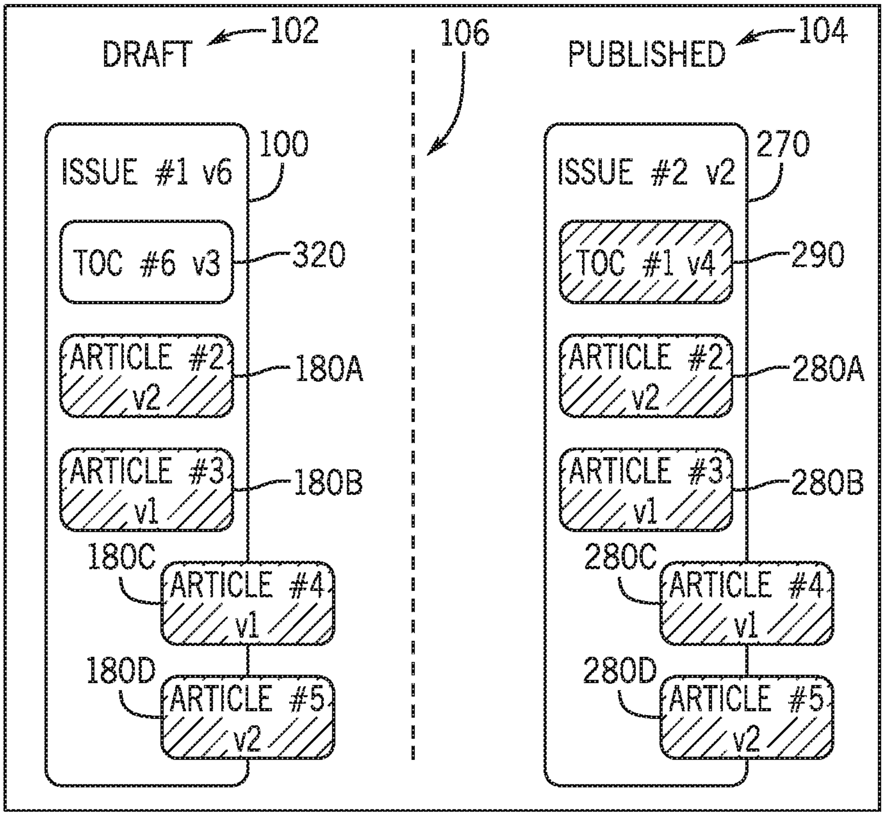
FIG. 26 is a block diagram of a published issue and a draft issue that has been unlocked for editing, according to embodiments of the present disclosure.

To help illustrate, FIG. 26 is a block diagram of the published issue 270 and the draft issue 100 that has been unlocked for editing and includes a new, or updated, draft table of contents 320. More specifically, as discussed above, the draft table of contents 320 may be an updated version of the draft table of contents 150 generated based on the contents of the published issue 270. For example, the draft table of contents 150 may be updated to account for changes made to the published issue 270 of contents thereof for which corresponding changes have not been made in the draft issue 100.

Returning to FIG. 25 and the discussion of the process 370, at process block 378, the cloud publishing device 66 may receive user input to remove one or more draft articles from the draft issue. For example, the cloud publishing device 66 may receive user input to remove draft article 180B and draft article 180C. Furthermore, based on the user input, at process block 380, the cloud publishing device 66 may remove the draft article(s) 180 indicated by the user input.

Figure 27:
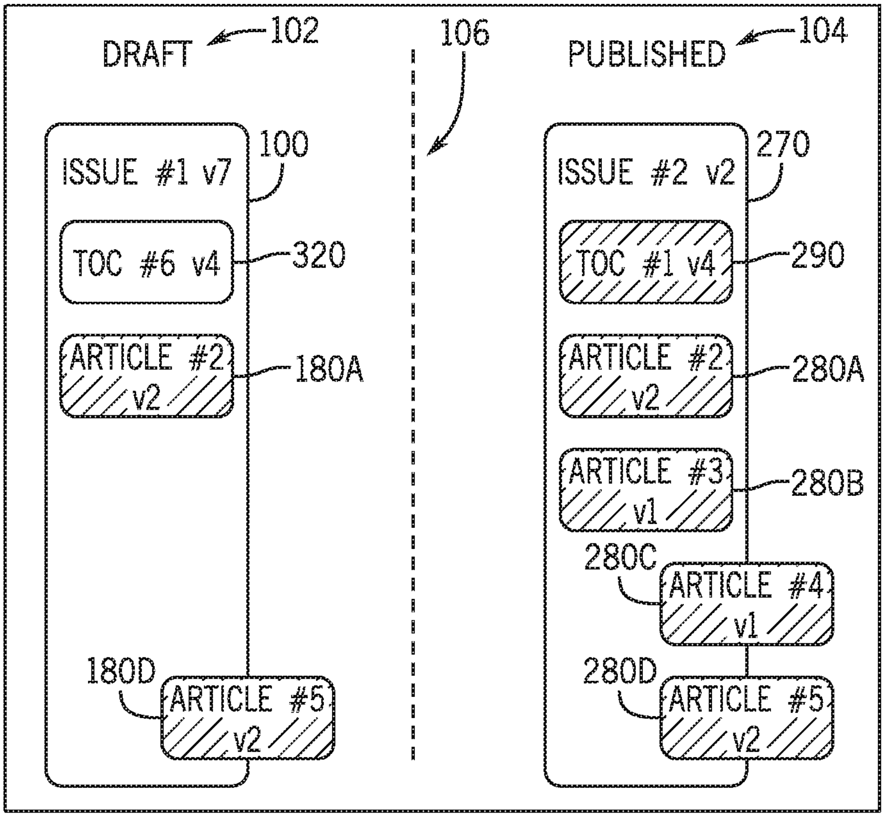
FIG. 27 illustrates a block diagram of the draft issue and published issue of FIG. 26 after some draft articles have been removed, according to embodiments of the present disclosure.

FIG. 27 illustrates a block diagram of the draft issue 100 and published issue 270 after some of the draft articles 180 have been removed based on user input. For instance, continuing with the example in which user input was received to remove draft article 180B and draft article 180C, as illustrated in FIG. 27, the draft article 180B and draft article 180C are no longer included in the draft issue 100. However, it should be noted that the corresponding published articles (e.g., published article 280B and published article 280C) are still included in the published issue 270, and thus, publically accessible. In other words, until the draft issue 100 is republished (after one or more draft articles 180 have been removed), the published issue 270 may still include published articles 280 corresponding to removed draft articles 180.

As mentioned above, the process 370 also pertains to deleting articles. Returning to FIG. 25, at process block 382, the cloud publishing device 66 may receive user input to delete one or more articles. For example, the cloud publishing device 66 may receive user input to delete draft article 180D. At decision block 384, the cloud publishing device 66 may determine whether the article to be deleted is an issue-independent article. In other words, the cloud publishing device 66 may determine whether there are any outside articles (e.g., a draft article outside of the draft issue 100 or a published article outside of the published issue 270) corresponding to the draft article 180D to be deleted. For instance, continuing with the example of deleting draft article 180D, the cloud publishing device 66 may determine that the draft article 180D is an issue independent article (e.g., based on one or more related article identifiers 207 and/or the linking data 216).

Upon determining that the article to be deleted is not an issue-independent article, at process block 386, the cloud publishing device 66 may delete the draft article 180D and a corresponding published article 280D. That is, the cloud publishing device 66 may delete the draft article 180D indicated by a user input as well as a published article 280D previously generated based on the draft article 180D.

Figure 28:
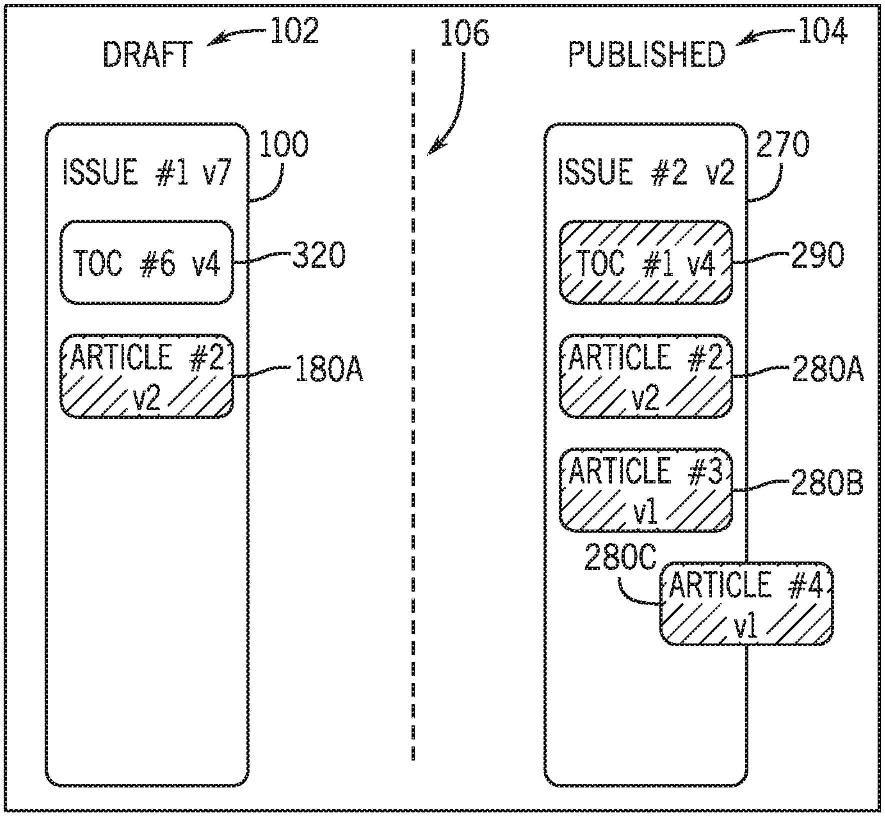
FIG. 28 illustrates a block diagram of the draft issue and published issue of FIG. 27 after an article has been deleted, according to embodiments of the present disclosure.

However, if at decision block 384 the cloud publishing device 66 determines that the article to be deleted is an issue-independent article, at process block 388, the cloud publishing device 66 may delete the draft article 180D, a corresponding published article 280D from the published issue 270, and any outside articles. In other words, articles outside of the draft issue 100 or published issue 270 that have the same content (e.g., another programming object having the same content) may be deleted. For instance, continuing with the example of deleting the draft article 180D, upon determining that the draft article 180D is an issue-independent article, the cloud publishing device 66 may delete the draft article 180D, the published article 280D, and any articles outside of the draft issue 100 or published issue 270 that correspond to the draft article 180D (e.g., as indicated by one or more related article identifiers 207 and/or the linking data 216). To help illustrate deleting articles, FIG. 28 is a block diagram that illustrates the draft issue 100 and published issue 270 after the draft article 180D and corresponding published article 280D have been deleted. As can be seen by comparing FIG. 28 to FIG. 27, deleting an article may cause the article to be deleted from both the draft issue 100 and the published issue 270.

Before proceeding to discuss other features of the process 370, it should be noted that while the example above discussed deleting a draft article from the draft issue 100, the deletion outside of the draft issue 100 may also result in a draft article 180 and corresponding published article 280 being deleted. For instance, if a content provider 62 were to delete the outside article associated with the draft article 180, the outside article (e.g., a draft article), a published article corresponding to the outside article (e.g., a published article that exists outside of an issue or a published article located in a published issue other than the published issue 270), the draft article 180, and the published article 280 may be deleted. Furthermore, deleting a published article may cause the published article and a corresponding draft article to be deleted.

As noted above, the cloud publishing device 66 may also enable a reversion in the draft issue 100 based on the contents of the published issue 270. For instance, returning to FIG. 25, at process block 390, the cloud publishing device 66 may receive user input to revert the draft issue 100 to the most recent version of the published issue 270. Upon receiving such an input, at process block 392, the cloud publishing device 66 may overwrite the draft issue 100 with articles from the most recent version of the published issue 270. In other words, the cloud publishing device 66 may determine the contents of the published issue 270, modify the draft issue 100 to include draft articles 180 that correspond to the published articles 280 included in the published issue 270, and update the draft table of contents 320 to reflect the changes made to the draft article 180.

Figure 29:
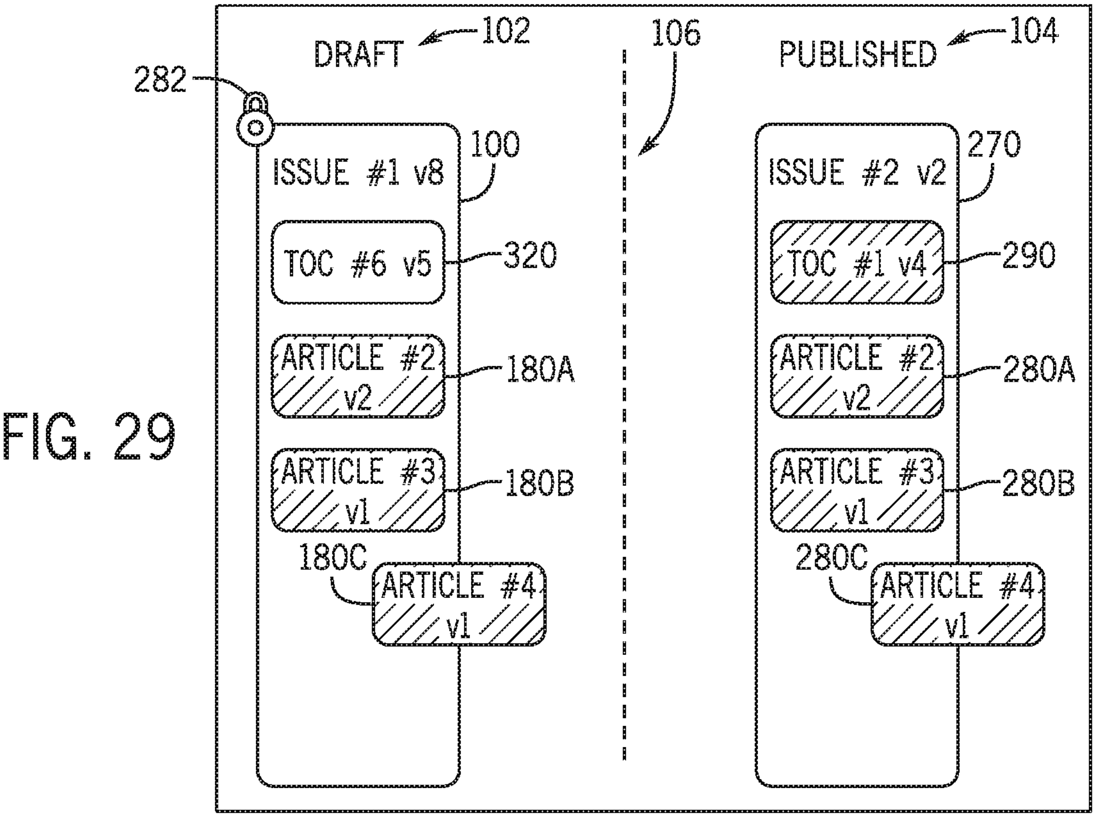
FIG. 29 illustrates a block diagram of the draft issue and the published of FIG. 28 after a reversion to the draft issue based on a most recent version of the published issue has occurred, according to embodiments of the present disclosure.

As an example, FIG. 29 is a block diagram illustrating the draft issue 100 and the published issue 270 after a reversion has occurred. In the illustrated embodiment, a content provider has requested a reversion based on the published issue 270 shown in FIG. 28. In response, the cloud publishing device 66 has added draft article 180B and draft article 180C to the draft issue 100. Additionally, the cloud publishing device 66 has updated the draft table of contents 320 (e.g., as indicated by "v5" compared to "v4" in FIG. 28). Moreover, the cloud publishing device 66 may modify the issue (e.g., the version identifier 124), as reflected by "v8".

Furthermore, in some embodiments, such as the illustrated embodiment, the cloud publishing device 66 may lock the draft issue 100 for editing.

Figure 30:
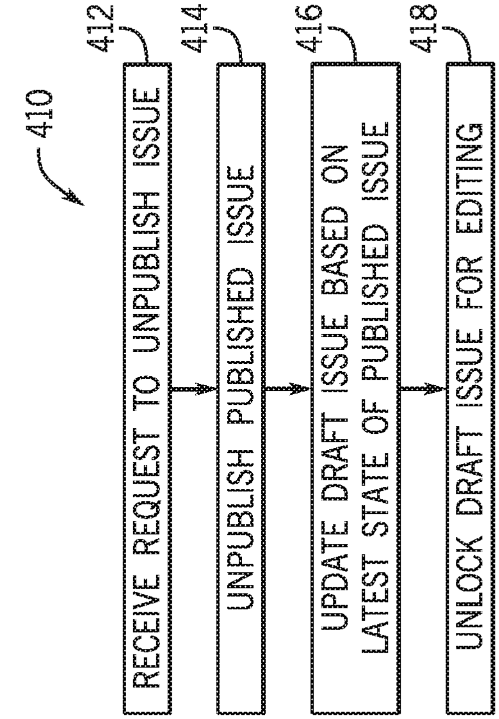
FIG. 30 is a flow diagram of a process for unpublishing a published issue, according to embodiments of the present disclosure.

In addition to enabling actions (e.g., editing, removing, deleting) to be performed to articles within issues, the cloud publishing device 66 may also facilitate the actions to be performed to issues. For example, the cloud publishing device 66 may enable the "unpublishing," or retraction, of a published issue. With this in mind, FIG. 30 is a flow diagram of a process 410 for unpublishing a published issue 270. The process 410 may be implemented in the form of an application program that includes instructions that are executed by at least one suitable processor of a computer system, such as the processing circuitry 70 of the cloud publishing device 66. The illustrated process 410 is merely provided as an example, and in other embodiments, certain illustrated steps of the process 410 may be performed in other orders, skipped, or repeated, according to embodiments of the present disclosure. As discussed below, the process 410 generally includes receiving user input to unpublish a published issue (e.g., process block 412), unpublishing the published issue based on the user input (e.g., process block 414), unlocking a corresponding draft issue for editing (e.g., process block 416), and updating the draft issue based on the state of the published issue, for instance, at the time of unpublication (e.g., process block 418).

At process block 412, the cloud publishing device 66 may receive user input to unpublish a published issue, such as the published issue 270. For example, via an application or platform implemented or provided by the cloud publishing device to the content providers 62, content providers 62 may submit a request for the published issue 270 to be unpublished (e.g., retracted from public distribution).

At process block 414, the cloud publishing device 66 may unpublish the published issue 270. More specifically, the cloud publishing device 66 may cease to make available the published issue 270. As explained below with respect to FIG. 31, it should be noted that the published articles 280 within the published issue 270 may still be distributed by the cloud publishing device 66 or otherwise publically accessible (e.g., accessible by the article URL 206). However, the collection of the published articles (i.e., the published issue 270) is not available. Furthermore, in the case of issue-independent articles, it should be noted that articles outside of the published issue 270 will be unaffected. For instance, an outside article published in a different published issue may still be publically accessible.

At process block 416, the cloud publishing device 66 may update the draft issue 100 based on the published issue 270 (e.g., based on the contents of the published issue 270). The cloud publishing device 66 may update the draft issue 100 in the same manner as discussed above with respect to updating draft issues after being unlocked for editing. For example, the draft table of contents 320 may be updated, the version identifier 164 of the draft table of contents 320 may be updated, and the version identifier 204 of the draft issue 100 may be updated. Furthermore, at process block 418, the cloud publishing device 66 may unlock the draft issue 100 for editing, for example, in the manner discussed above.

As noted above, in some cases, some steps of the process 410 may be omitted. As an example, if the draft issue 100 is already unlocked, the cloud publishing device 66 may perform the process 410 by only receiving user input to unpublish a published issue (e.g., process block 412) and unpublishing the published issue based on the user input (e.g., process block 414). In other words, the cloud publishing device 66 may not unlock a corresponding draft issue for editing (e.g., process block 416) or update the draft issue based on the state of the published issue (e.g., process block 418). The cloud publishing device 66 may perform the process 410 in the manner to prevent overwriting the draft issue 100 with changes that have not been published (e.g., included in published issue 270).

Figure 31:
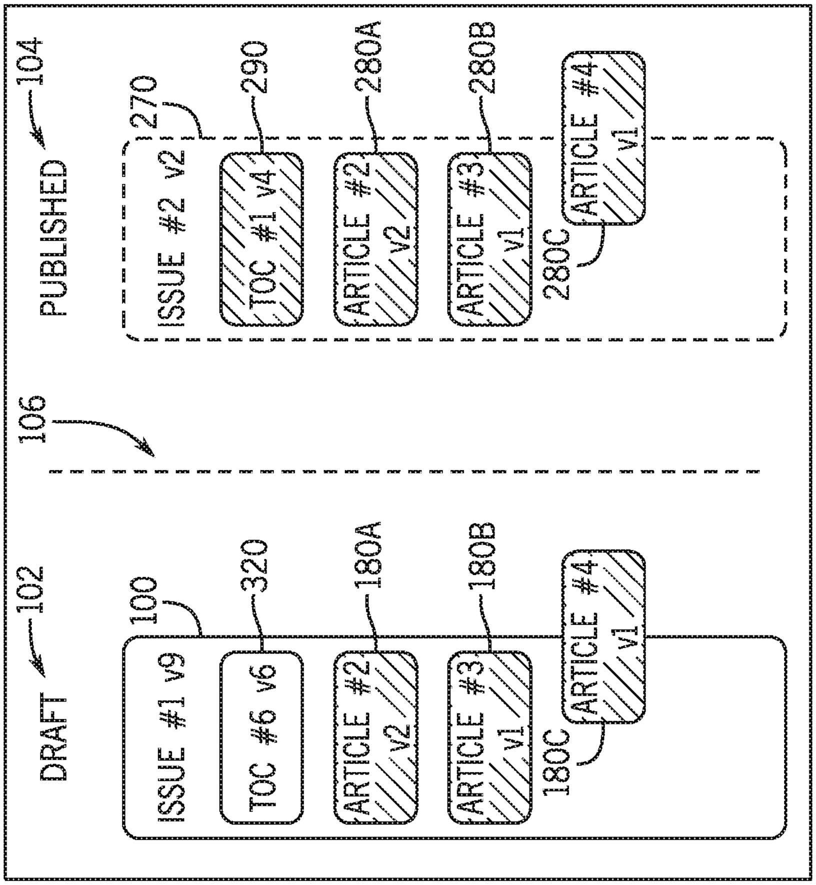
FIG. 31 is a block diagram of the draft issue the published articles of the published issue of FIG. 29 after unpublishing of the published issue has occurred, according to embodiments of the present disclosure.

To help illustrate the process 410, FIG. 31 is a block diagram of the draft issue 100 and the published articles 280 and published table of contents 290 of the published issue 270 after unpublishing the published issue 270. For example, in response to receiving a request to unpublish the embodiment of the published issue 270 illustrated in FIG. 29, the cloud publishing device 66 may perform operations of the process 410 to result in the embodiments of the draft issue 100 and content of the published issue 270 (e.g., published articles 280 and published table of contents 290) illustrated in FIG. 31.

Figure 32:
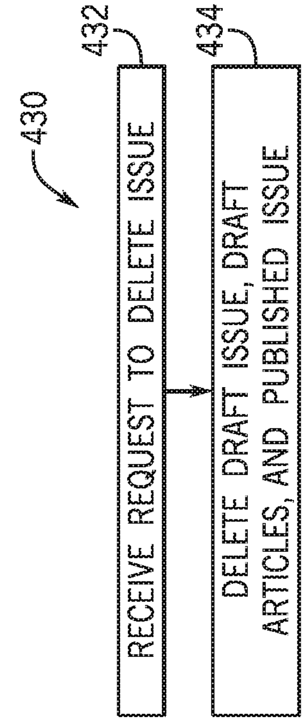
FIG. 32 is a flow diagram of a process for deleting an issue, according to embodiments of the present disclosure.

In addition to unpublishing issues, the cloud publishing device 66 enables issues to be deleted. With this in mind, FIG. 32 is a flow diagram of a process 430 for deleting an issue. The process 430 may be implemented in the form of an application program that includes instructions that are executed by at least one suitable processor of a computer system, such as the processing circuitry 70 of the cloud publishing device 66. The illustrated process 430 is merely provided as an example, and in other embodiments, certain illustrated steps of the process 430 may be performed in other orders, skipped, or repeated, according to embodiments of the present disclosure. As discussed below, the process 430 generally includes receiving a request to delete an issue (e.g., process block 432) and deleting a draft issue, draft articles included within the draft issue, and a published issue (e.g., process block 434).

At process block 432, the cloud publishing device 66 may receive a request to delete an issue, such as published issue 270. For example, via an application or platform implemented or provided by the cloud publishing device to the content providers 62, content providers 62 may submit a request to delete an issue. Additionally, at process block 434, the cloud publishing device 66 may delete the published issue indicated by the request (e.g., published issue 270), the draft issue 100, and the draft articles included in the draft issue 100 (e.g., draft table of contents 320 and draft articles 180). In other words, the draft issue 100, draft table of contents 320, draft articles 180, and published issue 270 may be deleted (e.g., no longer stored in the memory 72 of the cloud publishing device 66). However, data previously associated with, or included in, the published issue 270 may still exist. For instance, the published articles 280 and published table of contents 290 may not be deleted and remain available. Additionally, in some embodiments, while the draft issue 100 and draft table of contents 320 may be deleted, the draft articles 180 may not be deleted.

Figure 33:
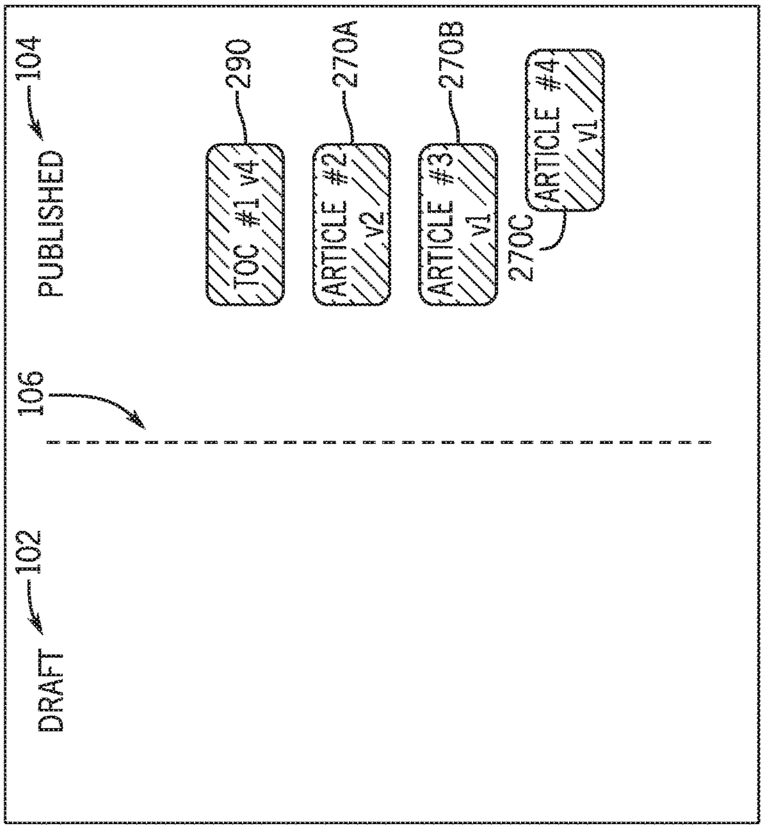
FIG. 33 is a block diagram of the published articles of FIG. 31 after the draft issue of FIG. 31 has been deleted, according to embodiments of the present disclosure.

For instance, FIG. 33 is a block diagram that includes published articles 280 and the published table of contents 290. More specifically, FIG. 33 depicts the result of receiving a request to delete the draft issue 100 or published issue 270 of FIG. 31. As illustrated, only the published articles (e.g., published table of contents 290 and published articles 280) remain. Moreover, the published table of contents 290 and published articles 280 may still be provided to the electronic devices 10. For instance, the published table of contents 290 and published articles 280 that are not issue-independent articles may respectively be accessible via the table of contents URL 166 and the article URLs 206, whereas issue-independent articles (or content associated with issue-independent articles) may be accessible via the article URLs 206 or via outside articles.

While the example of deleting a published issue (e.g., receiving user input to delete published issue 270) is provided above, it should be noted that draft issues may also be deleted. Upon receiving a request to delete a draft issue (e.g., draft issue 100), the cloud publishing device 66 may delete the draft issue 100, the articles included in the draft issue 100 (e.g., draft table of contents 320 and draft articles 180), and the published issue that corresponds to the draft issue 100 (e.g., published issue 270).

As discussed above, the cloud publishing device 66 may provide a platform or application that content providers 62 may utilize to make issues and publish issues. With this in mind, FIGS. 34-45, which are discussed individually below, are provided to illustrate examples of such a platform or application with which content providers 62 may interact. Additionally, it should be noted that such a platform or application may be provided to the content providers 62 via the internet. For example, content providers 62 may navigate to a webpage or through an application (e.g., software application such as a mobile application) to interact with the cloud publishing device 66.

Figure 34:
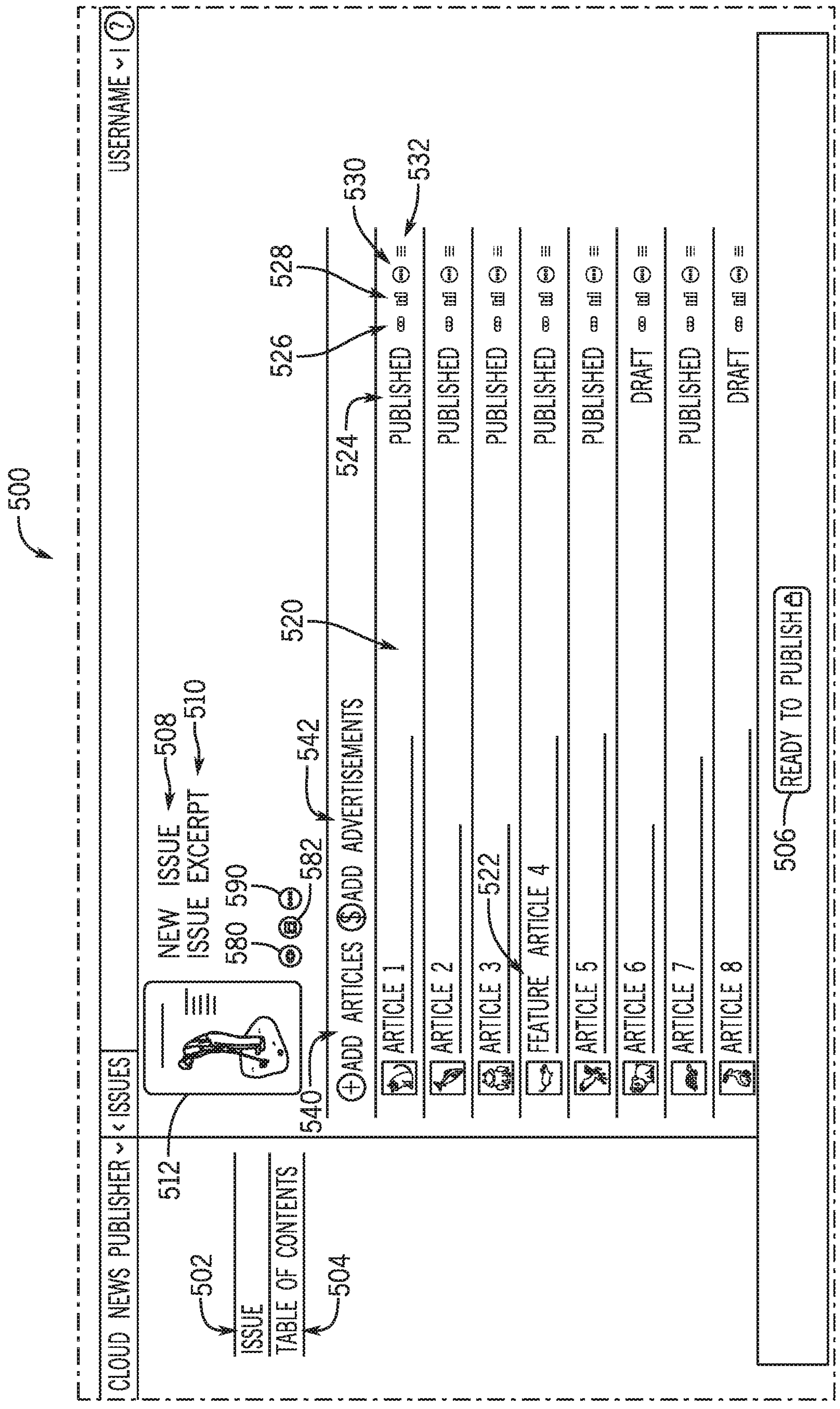
FIG. 34 illustrates a user interface of a platform or application provided by the cloud publishing device of FIG. 7, according to embodiments of the present disclosure.

FIG. 34 illustrates a user interface 500 of a platform or application that the cloud publishing device 66 may provide to content providers 62. Content providers 62 may interact with the user interface 500 to edit an issue. As indicated by an issue tab 502, the user interface 500 is for editing issues. As discussed below, content providers 62 may select a table of contents tab 504 to view a user interface specific to the table of contents of an issue and to modify the table of contents.

The user interface 500 includes information related an issue and the contents included in the issue. For example, a user (e.g., content provider) may construct a draft issue and make changes to the draft issue via the user interface 500. Additionally, the user may cause an issue to be published (e.g., cause the cloud publishing device 66 to generate a published issue) by selecting the publication icon 506.

Users may see information pertaining to an issue as well as edit the contents of the issue via the user interface 500. For example, the user interface 500 indicates the title 508, issue excerpt 510, and cover image 512 for the issue, which respectively correspond to the title indicator 132, excerpt 134, and cover image 136 of FIG. 10. A user may select (e.g., via input structures of an electronic device, such as input structures 22 discussed above with respect to electronic device 10) the title 508, issue excerpt 510, and cover image 512 to make modifications to the title 508, issue excerpt 510, and cover image 512.

The user interface 500 may include an articles list 520, which indicates the articles and advertisements included in an issue. Articles and advertisements may include a type indicator 522. For instance, for articles, the type indicator 522 may indicate that an article is a featured article, which as discussed below, may alter where the article is listed in the table of contents for the issue. Advertisements may also include a type indicator 522 to indicate that an advertisement is an advertisement.

Articles and advertisements listed in the articles list 520 may also include a draft/published status indicator 524, a link button 526, a statistics button 528, a settings button 530, and an order button 532. The draft/published status indicator 524 indicates whether an article or advertisement has been published (e.g., in the present issue or in another issue). The link button 526, when selected, causes a direct link (e.g., a specific URL) to the article to be displayed. The statistics button 528 enables statistics about a particular article to be presented via the user interface 500. For instance, in response to receiving user input indicative of a selection of the statistics button 528, an analytics page for the article may be presented via the user interface 500. The settings button 530 enables other settings regarding articles or advertisements to be changed. For example, the settings button 530 may enable a user to select a publication date specific to an article (e.g., for publication before the issue is published). The order button 532 may be selected by a user to change the order of articles and advertisements in the article list 520. For example, a user may select the order button 532 to enable an article to be dragged to and dropped in a different location (e.g., between different articles) to modify the order of articles and advertisements within an issue.

Figure 35:
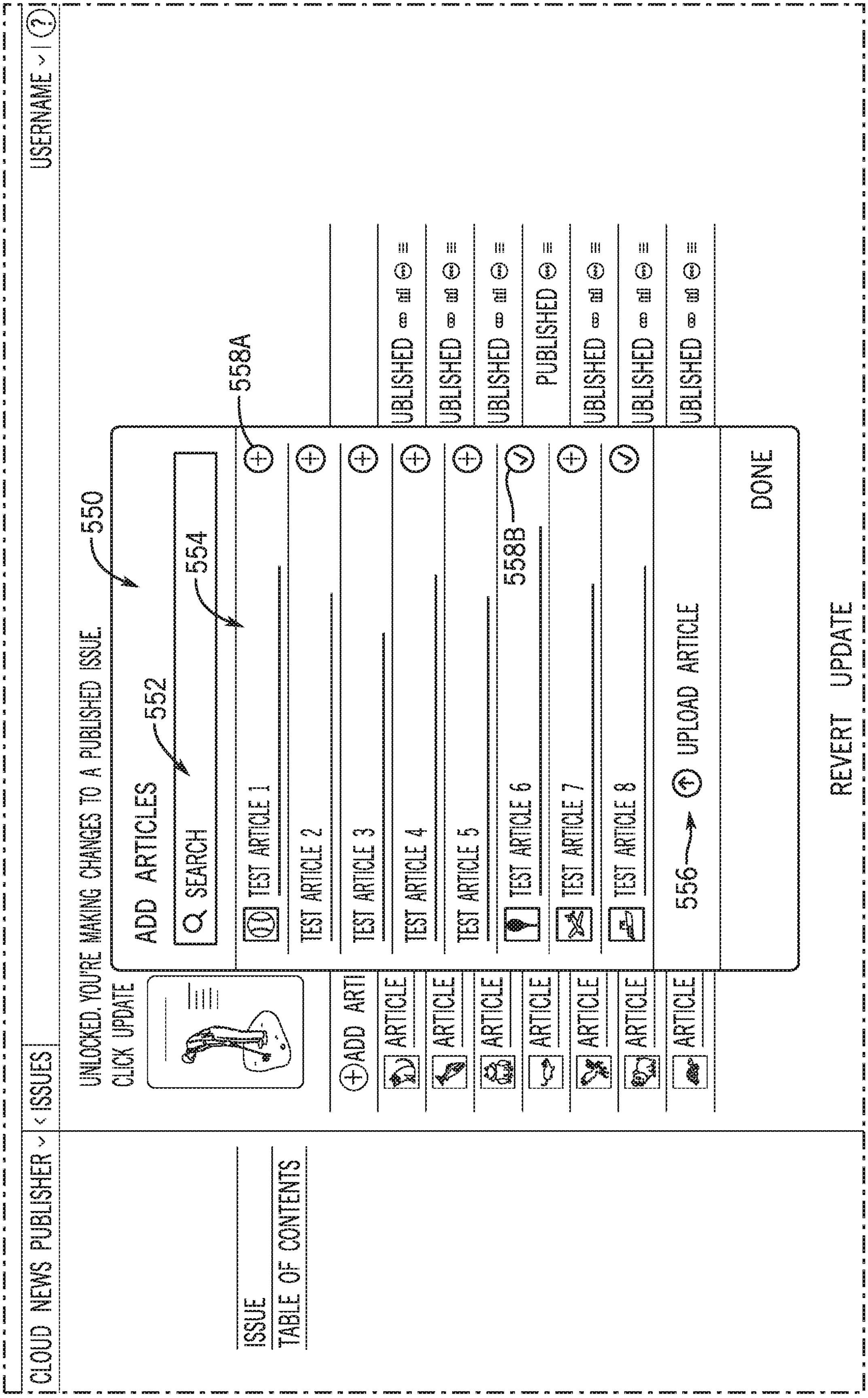
FIG. 35 illustrates an article selection user interface, according to embodiments of the present disclosure.

The user interface 500 also includes an article selection button 540 and an advertisement selection button 542, which may be selected to respectively add articles and advertisements to an issue. To help illustrate, FIG. 35 illustrates an article selection user interface 550, which the cloud publishing device 66 may provide to the content provider upon the content provider selecting the article selection button 540. As illustrated, the article selection user interface 550 includes a search box 552, a listing of articles 554, an upload article button 556, and status indicators 558.

Content providers may provide articles and advertisements to the cloud publishing device 66. For example, articles may be uploaded to the cloud publishing device 66 by selecting the upload article button 556 and selecting an article to be uploaded to the cloud publishing device 66. Articles uploaded by a particular content provider (e.g., while editing a current issue or previous issues) may be presented in the listing of articles 554. For example, to access the platform or application provided by the cloud publishing device 66, a user may be required to present credentials such as a username and password. Based on the credentials, the cloud publishing service may determine a content provider that the user is associated with and a data channel specific to that content provider. Thus, when the user views the article selection user interface 550 or an advertisement selection user interface 570 of FIG. 36, articles and advertisements associated with a specific content provider (e.g., articles or advertisements included in one or more data channels specific to the content provider) may be provided to the user. It should be noted that, in some embodiments, some advertisements and articles may not be specific to the particular content provider. Additionally, users may utilize the search box 552 to search through articles included in the listing of articles 554.

The status indicators 558 indicate whether an article is included in the issue. For example, status indicator 558A indicates that an article is not included in the issue, while status indicator 558B indicates that an article is included in the issue. A user may select the status indicator 558A to add a particular article to the issue as well as select the status indicator 558B to remove an article from the issue.

Figure 36:
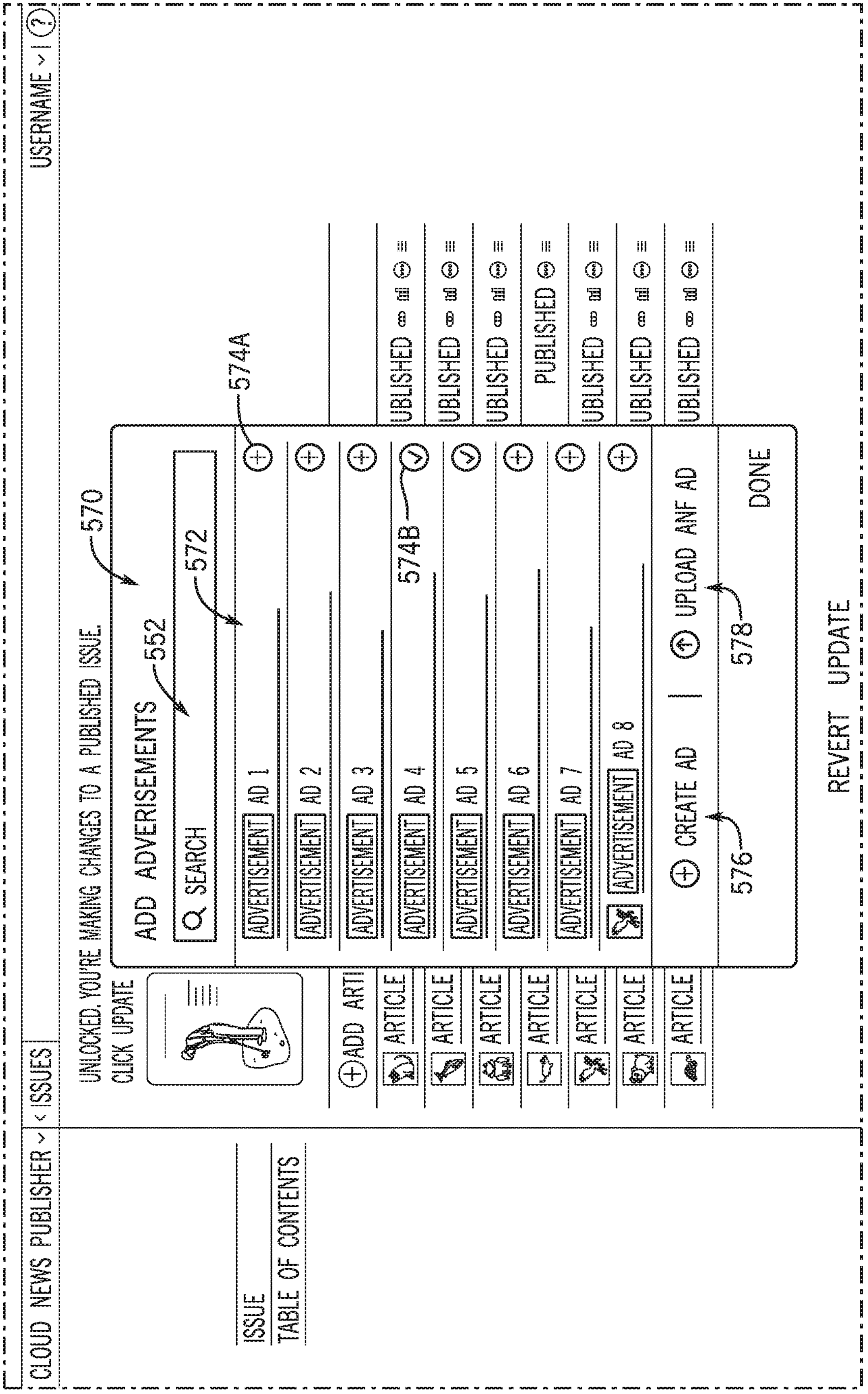
FIG. 36 illustrates an article selection user interface, according to embodiments of the present disclosure.

Referring briefly back to FIG. 34, a content provider may select the advertisement selection button 542 of the user interface 500 to cause the cloud publishing device 66 to provide an advertisement selection user interface, such as the advertisement selection user interface 570 illustrated in FIG. 36. Advertisements, such as content provider-specific advertisements, may be included in a listing of advertisements 572. Status indicators 574 indicate whether an advertisement is included in the issue. For example, status indicator 574A indicates that an advertisement is not included in the issue, while status indicator 574B indicates that an advertisement is included in the issue. A user may select the status indicator 574A to add a particular advertisement to the issue as well as select the status indicator 574B to remove a particular advertisement from the issue.

Furthermore, users may select an advertisement creation button 576 to be presented with a user interface to make a new advertisement. Additionally, users may upload advertisements by selecting the advertisement upload button 578.

Figure 37:
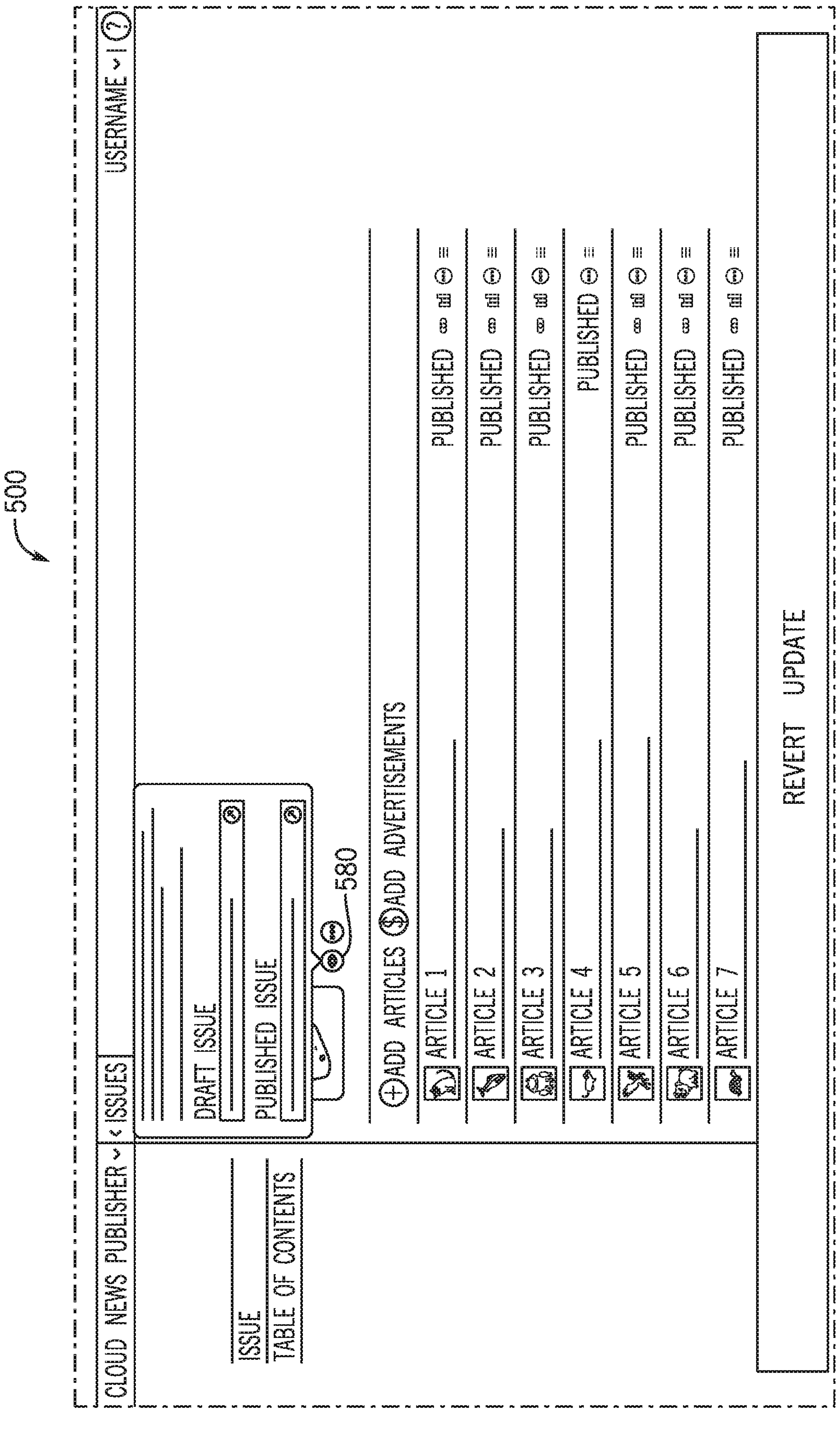
FIG. 37 illustrates the user interface of FIG. 34 providing uniform resource locators associated with a draft issue and a published issue, according to embodiments of the present disclosure.
Figure 38:
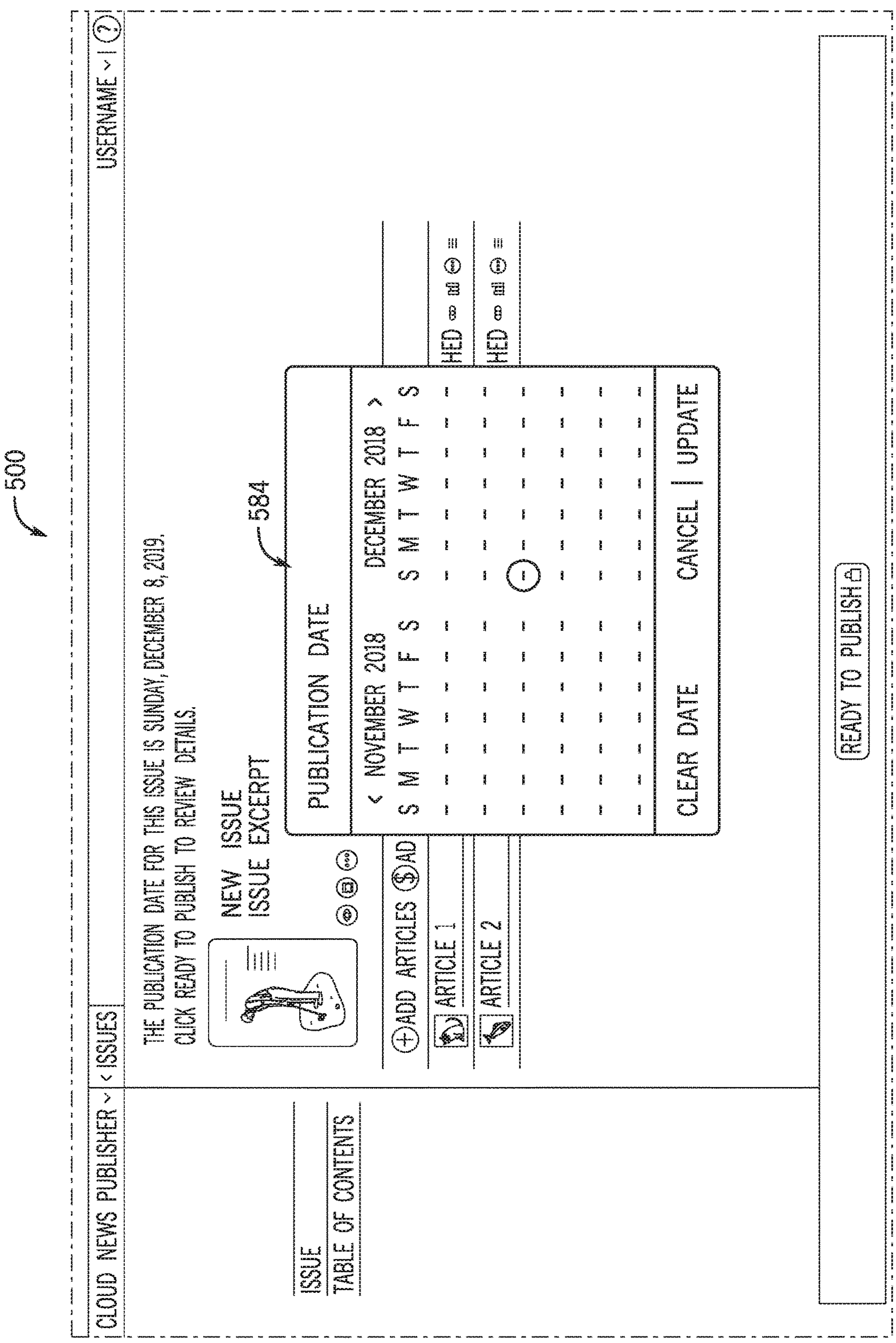
FIG. 38 illustrates a calendar interface that may be included in the user interface of FIG. 34, according to embodiments of the present disclosure.

Returning to FIG. 34, content providers may view the URLs associated with the draft issue and published issue for an issue shown in the user interface 500. For example, as illustrated in FIG. 37, a user may select the issue viewing button 580 to see the URLs associated with the draft issue and published issue for an issue. Users may proceed to the URLs to view the issues. However, it should be noted that a URL for a published issue may not be provided before an issue is published.

FIG. 34 also depicts a calendar button 582. The calendar button 582 may be selected to choose or modify dates associated with the issue, such as a publication date, on-sale date, or off-sale date. Upon receiving a user selection of the calendar button 582, the cloud publishing device 66 may provide an interface, such as calendar interface 584 illustrated in FIG. 38. For example, a user may select a date on of the calendar interface 584 to choose when an issue will be published, when the issue will be available to be purchased, and when the issue will no longer be offered for purchase. In some cases, the publication date and on-sale date may differ. For example, an issue may be offered for sale prior to publication of the issue.

Figure 39:
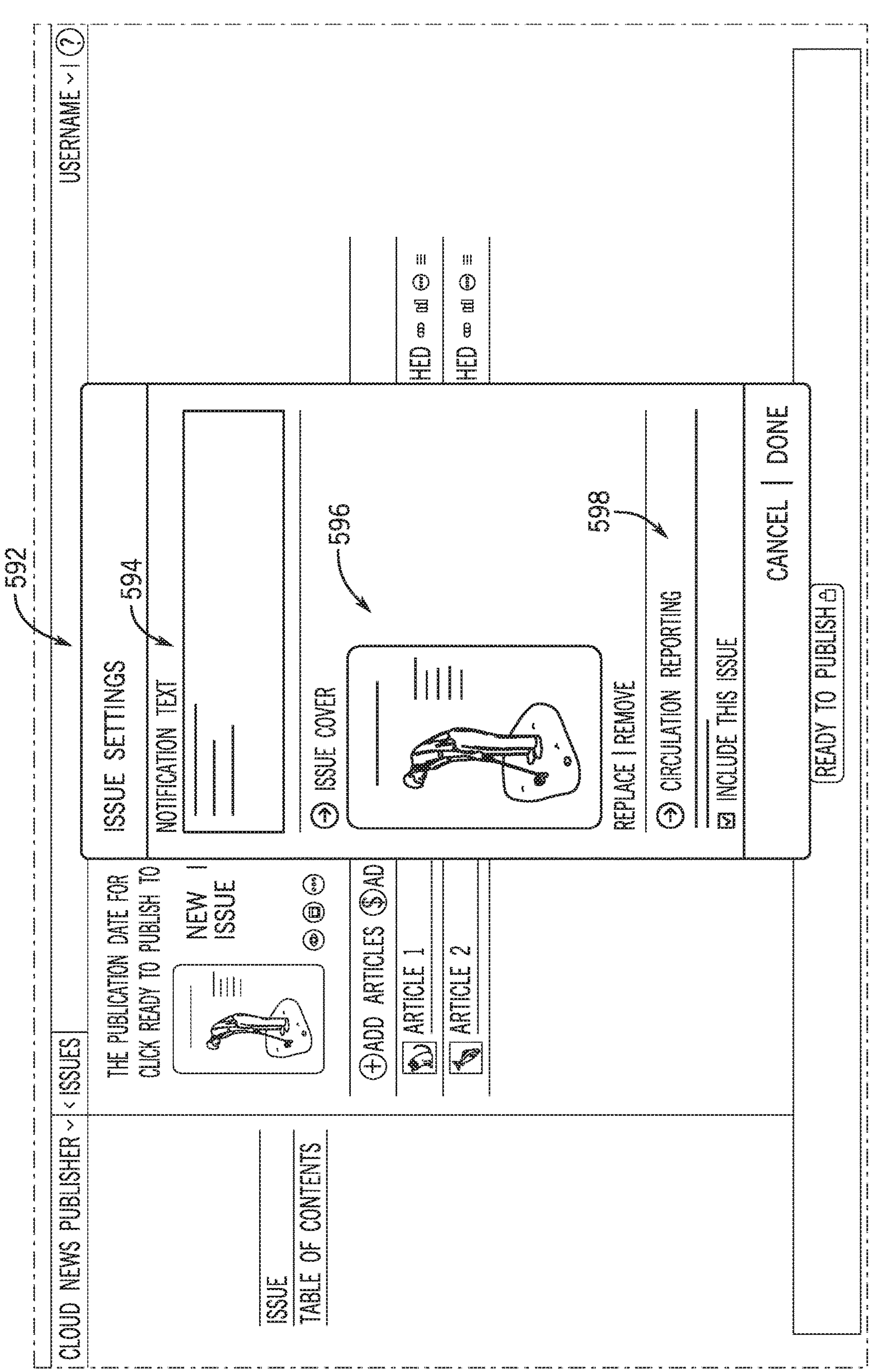
FIG. 39 illustrates an issue settings interface that may be included in the user interface of FIG. 34, according to embodiments of the present disclosure.

Various other settings associated with an issue may also be edited via the user interface 500. For example, a user may select a settings button 590 included in FIG. 34 to cause the cloud publishing device 66 to provide for display an issue settings interface 592, which is illustrated in FIG. 39. A user may interact with the issue settings interface 592 to select notification text 594 (e.g., corresponding to the notification text 138 of FIG. 10) associated with an issue. The notification text 594 may refer to text included in a message that may be provided to potential readers of the issue upon publication (e.g., users of electronic devices 10), for instance, to notify the potential readers that the issue has been published. A word count or character count of the notification text may also be provided. Moreover, content providers may view, replace, and remove an issue cover 596 (e.g., corresponding to the cover image 136 of FIG. 10.) via the issue settings interface 592. Furthermore, content providers may choose whether circulation reporting 598 should be provided for an issue. For example, content providers may select whether various statistics for an issue will be tracked. For example, numbers of purchases of the issue may be tracked. In some embodiments, a content provider may choose an on-sale date (corresponding to the on-sale date 142 of FIG. 10) and an off-sale date (e.g., corresponding to the off-sale date 144 of FIG. 10) for an issue via the issue settings interface 592.

Figure 40:
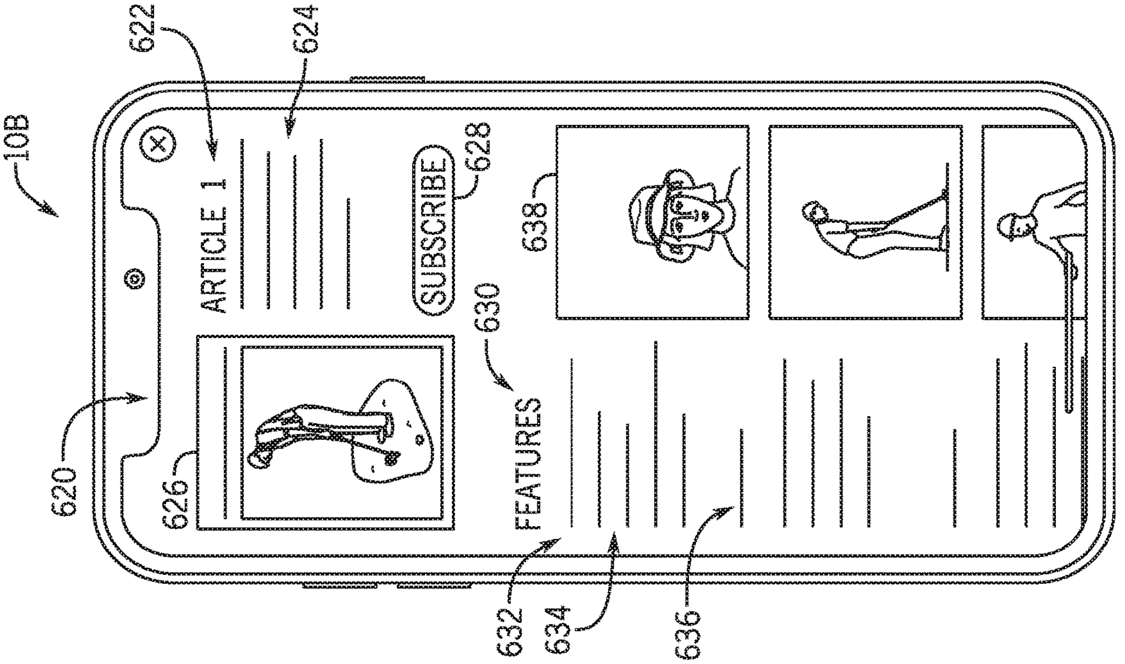
FIG. 40 illustrates a table of contents as displayed on an electronic device, according to embodiments of the present disclosure.

In addition to creating and modifying issues, content providers may also edit the table of contents associated with an issue. In particular, a default table of contents may be generated based on the order of articles in an issue as well as based on whether an article is a feature article. The table of contents, in some cases, may not include any advertisements. In other words, in some embodiments, the table of contents may provide information regarding an issue and articles within the issue but not include advertisements. Additionally, a user may build a custom table of contents. Before discussing editing of tables of contents in more detail, FIG. 40 is provided. In particular, FIG. 40 illustrates an example of a table of contents 620 as displayed on the electronic device 10, or more specifically, an embodiment of the electronic device 10B. As illustrated, the table of contents 620 includes an issue title 622, issue description 624, and an issue cover 626. The table of contents 620 also includes one or more buttons 628, section names 630, and articles 632. The articles 632, which may be representative of articles (e.g., published articles 280) included in the issue, may include article titles 634, bylines 636, and article images 638. The button 628 may include a button that can be selected to request to read or subscribe to an issue. The section names 630 may be titles for sections within the table of contents 620. For example, the illustrated section name 630 is for featured articles. Articles that a user indicates are featured articles may be included in a featured article section before other articles in an issue. In other words, the cloud publishing device 66 may arrange the table of contents 620 such that certain articles (e.g., featured articles) are listed before other articles included in an issue.

Figure 41:
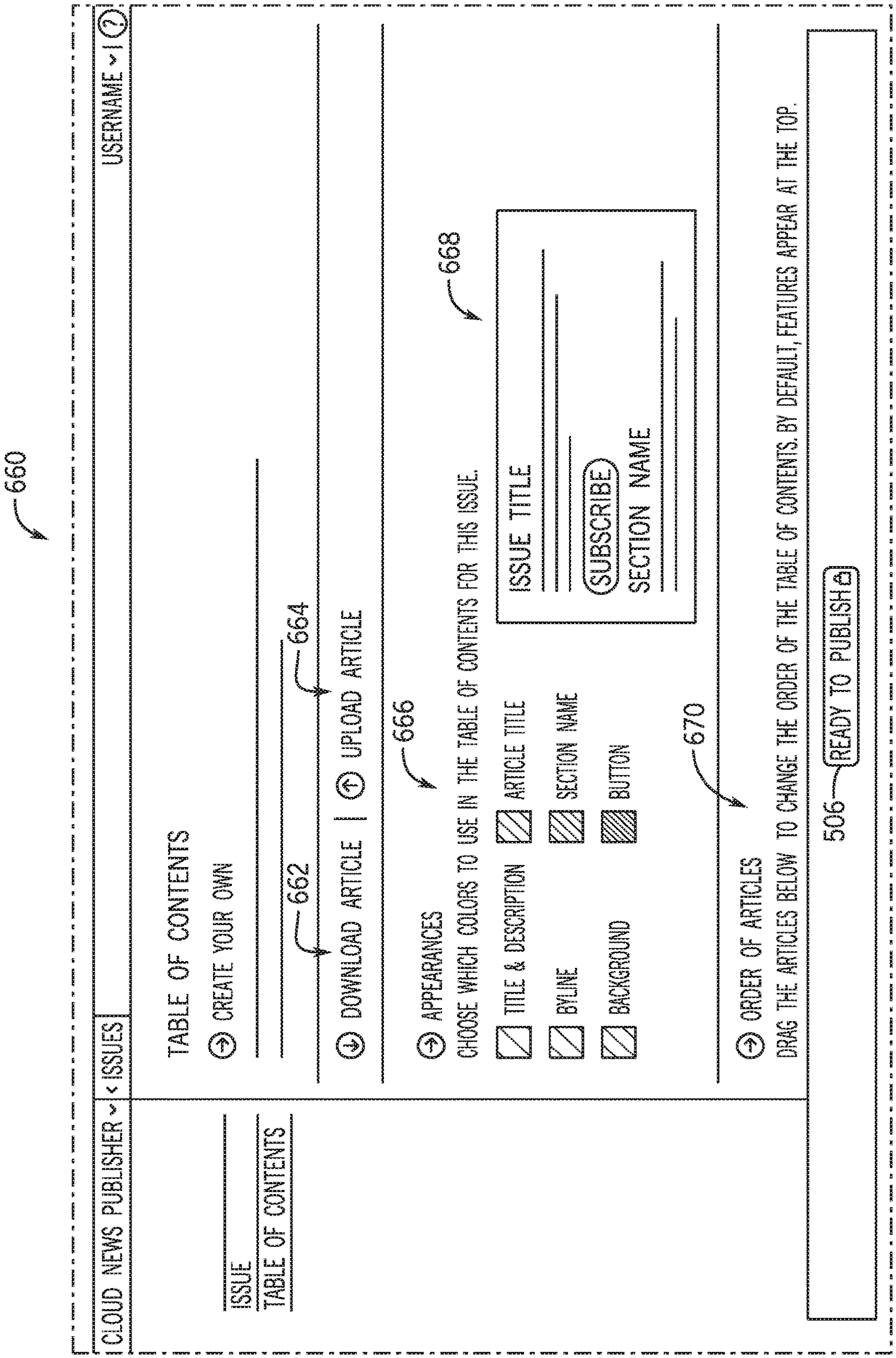
FIG. 41, illustrates another user interface of a platform or application provided by the cloud publishing device of FIG. 7, according to embodiments of the present disclosure.

Referring briefly back to FIG. 34, upon selecting the table of contents tab 504, the cloud publishing device 66 may provide a user interface related to a table of contents to a user. For example, FIG. 41 illustrates a user interface 660 related to a table of contents for an issue. As illustrated, the user interface 660 may include a download button 662, upload button 664, appearance settings section 666, a table of contents preview 668, and the publication icon 670.

As mentioned above, the cloud publishing device 66 may automatically generate a table of contents for an issue based on the articles included in the issue as well as whether an article is a feature article. However, content providers may also utilize their own table of contents. For example, to ensure that a content provider-created table of contents is compatible with the cloud publishing device 66, a user may select the download button 662 to download the table of contents generated by the cloud publishing device 66. The content provider may then edit the downloaded table of contents and upload the edited table of contents by selecting the upload button 664. The cloud publishing device 66 will then utilize a user-created custom table of contents for an issue.

Figure 42:
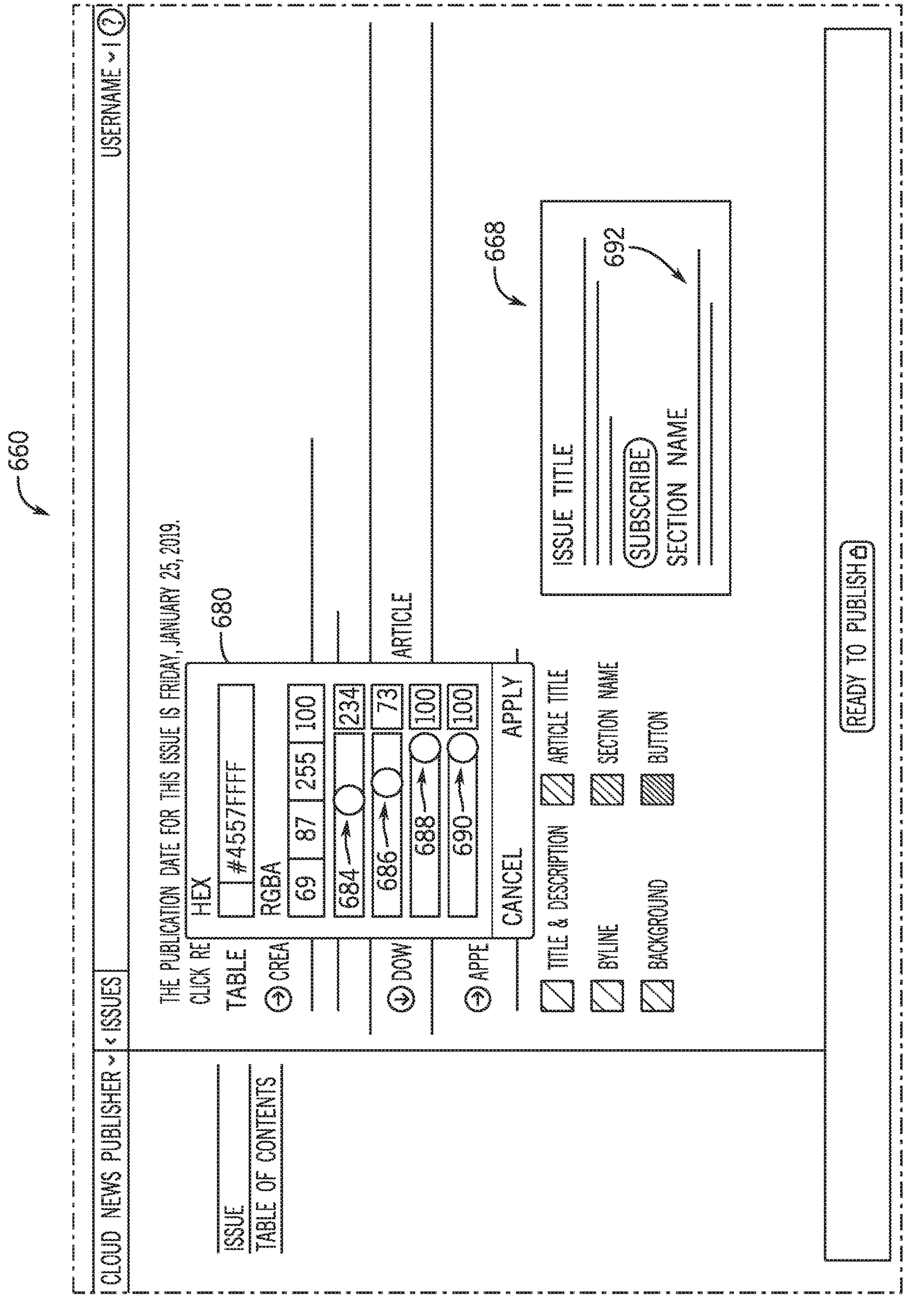
FIG. 42 illustrates a color settings interface of the user interface of FIG. 41, according to embodiments of the present disclosure.

Content providers may also edit various aesthetic features associated with the table of contents. For example, color settings (corresponding to the color settings data 172 of FIG. 11) associated with the issue title 622, issue description 624, article titles 634, bylines 636, section names 630, buttons 628, as well as a background color of a table of contents, such as the table of contents 620 of FIG. 40. For example, FIG. 42 illustrates a color settings interface 680 that may be presented. For example, a user may select a color icon 682 to cause the color settings interface 680 to be presented. By interacting with the color settings interface 680, a content provider may select a color for a portion of the table of contents. For example, a content provider may select a color by providing a hexadecimal value (e.g., hex triplet) of a color or a RGBA value for a color. Content providers may further modify the color settings by utilizing a hue slider 684 to modify a hue, a saturation slider 686 to modify saturation, a brightness slider 688 to modify brightness, and an opacity slider 690 to modify opacity.

The table of contents preview 668 provides a preview of how colors of various portions of the table of contents will appear. For example, upon a user selecting a color an article title, an article title 692 within the table of contents preview 668 may be presented in the selected color.

Figure 43:
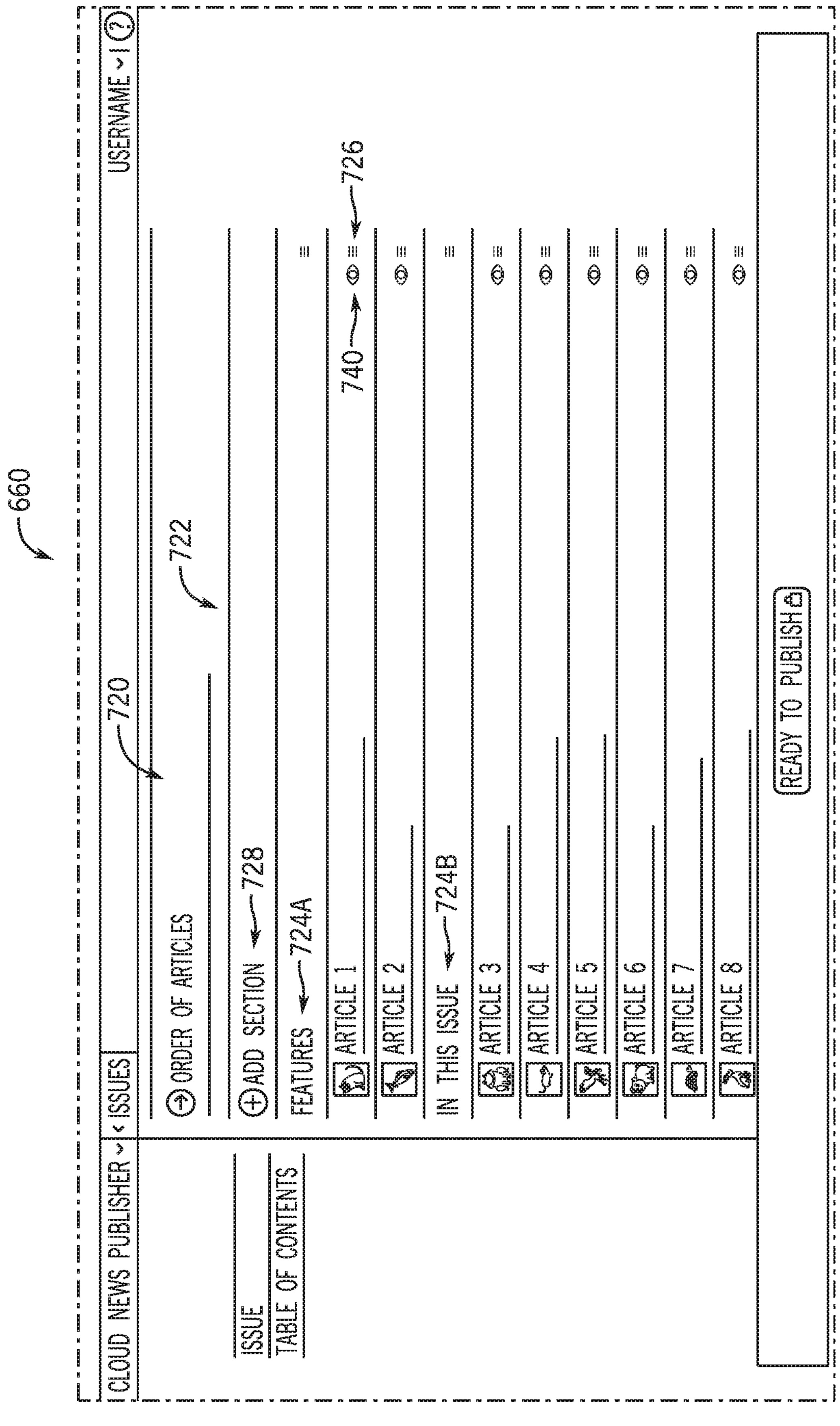
FIG. 43 illustrates of an order of articles section of the user interface of FIG. 41, according to embodiments of the present disclosure.

Content providers may further customize the table of contents in several ways. FIG. 43 illustrates an order of articles section 720 that may be included in the user interface 660. The order of articles section 720 may include an article list 722, which lists the order in which the articles of an issue will appear in the table of contents for the issue. More specifically, article list 722 may include sections 724 that include the articles within an issue. As discussed above (and in more detail below), the order of articles in the table of contents may be automatically generated based on an article's position within the issue as well as based on a classification of the article. For example, featured articles may appear higher in the table of contents (e.g., in a featured articles section 724A). As another example, advertisements may not be included in a table of contents based on their classification as advertisements.

Content providers may rearrange the order in which sections and articles are listed in the article list 722. For example, a content provider may select an order button 726 to enable an article to be dragged to and dropped in a different location within the article list 722 to modify the order of articles within the table of contents. For instance, a user may move an article within a section 724 of the article list 722 or into a different section of the article list 722.

Figure 44:
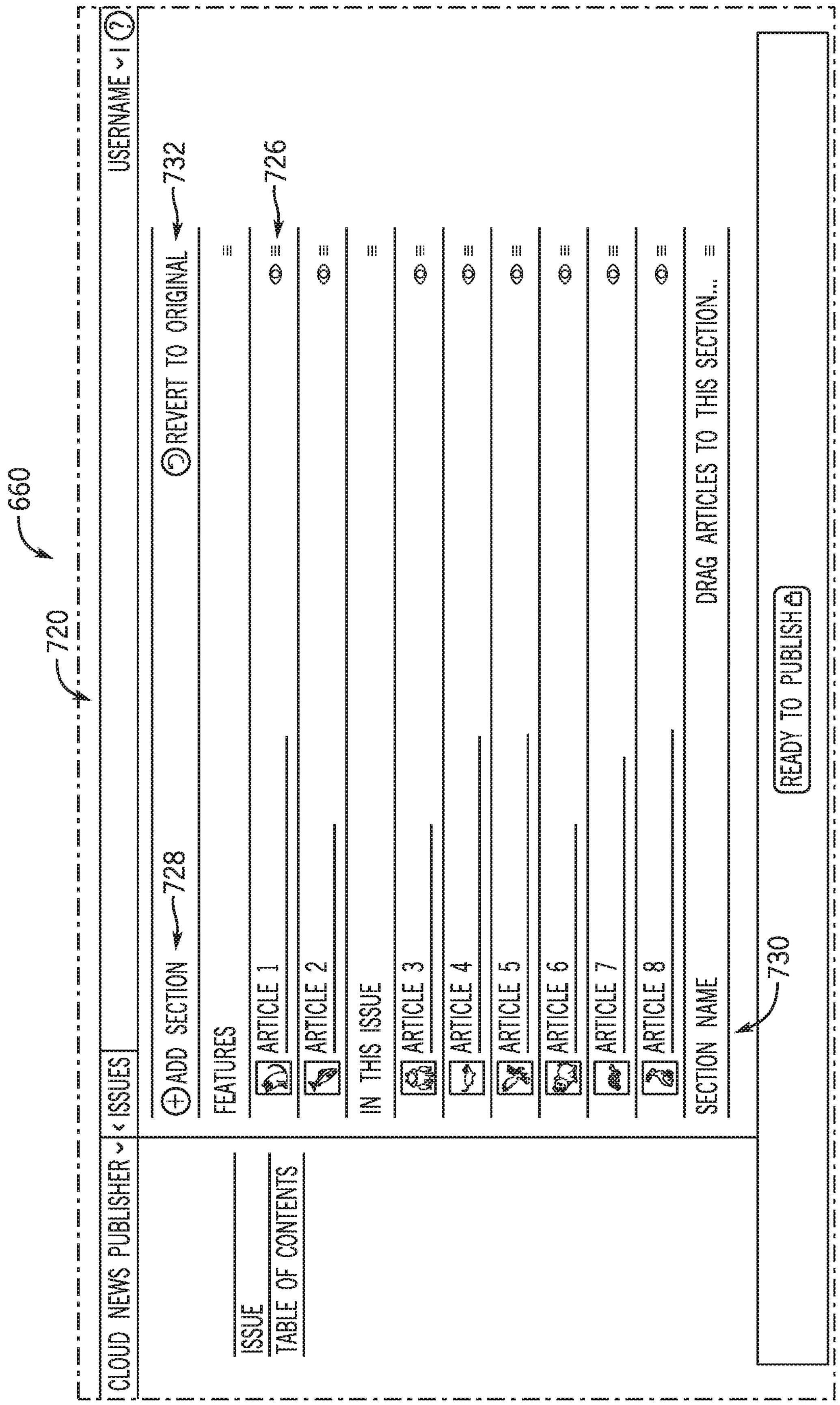
FIG. 44 illustrates the order of articles section of FIG. 43 after a new section has been added, according to embodiments of the present disclosure.

As noted above, the article list 722 includes several sections 724, such as the featured articles section 724A and a general article section 724B, which may include articles that are not featured articles (or featured articles if a user has moved a featured article into the general article section 724B). As illustrated, the order of articles section 720 includes a section addition button 728, which when selected, may cause the cloud publishing device 66 to generate a new section within the table of contents. For example, FIG. 44 illustrates the order of articles section 720 after a content provider has selected the section addition button 728 to request a new section 730 be added to the table of contents and the new section 730 has been added to the table of contents. Content providers may provide input (e.g., type) to name the new section 730. Additionally, content providers may move articles from other sections 724 into the new section 730 by using the order buttons 726. Furthermore, as illustrated in FIG. 44, a revert to original button 732 may be presented when a content provider makes a change in the order of articles section 720. Upon receiving user input indicative of a selection of the revert to original button 732, the cloud publishing device 66 may undo the changes made by the user and/or present the order of articles in the order originally included in the order of articles section 720.

Figure 45:
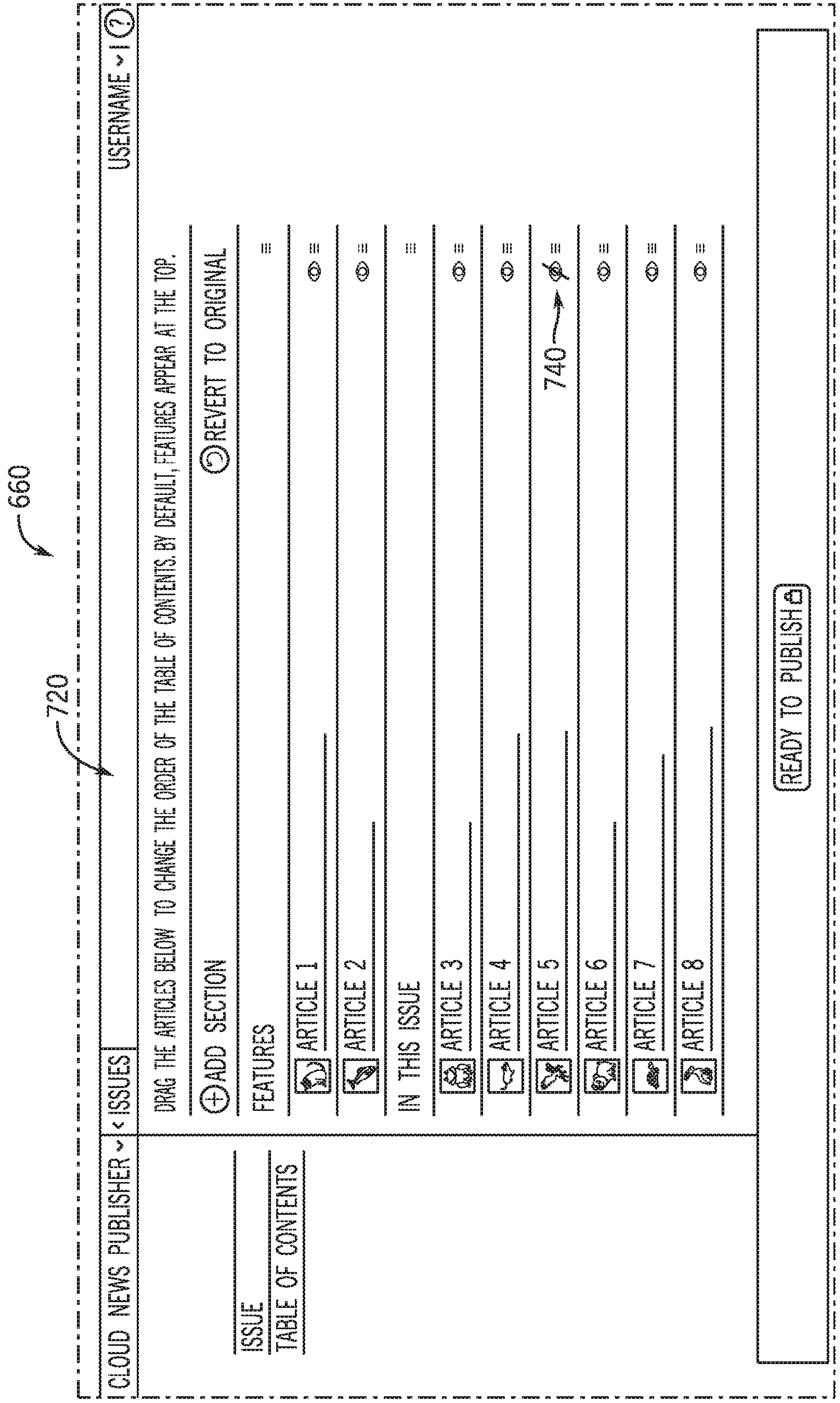
FIG. 45 illustrates the order of articles section of FIG. 43 after an article has been selected to not be included in a table of contents, according to embodiments of the present disclosure.

Returning to FIG. 43, content providers may also customize which articles are presented in the table of contents by interacting with a visibility indicator 740. In FIG. 43, each article is visible. However, FIG. 45 illustrates the order of articles section 720 after the visibility indicator 740 for one of the articles has been selected to no longer be included in the table of contents. Upon receiving user input to change the visibility of an article in the table of contents, the cloud publishing device 66 may alter the visibility indicator 740 and either add or remove the article from the table of contents. For example, a user's interaction with the visibility indicator 740 may cause the table of contents visibility status 220 for an article to be modified.

Figure 46:
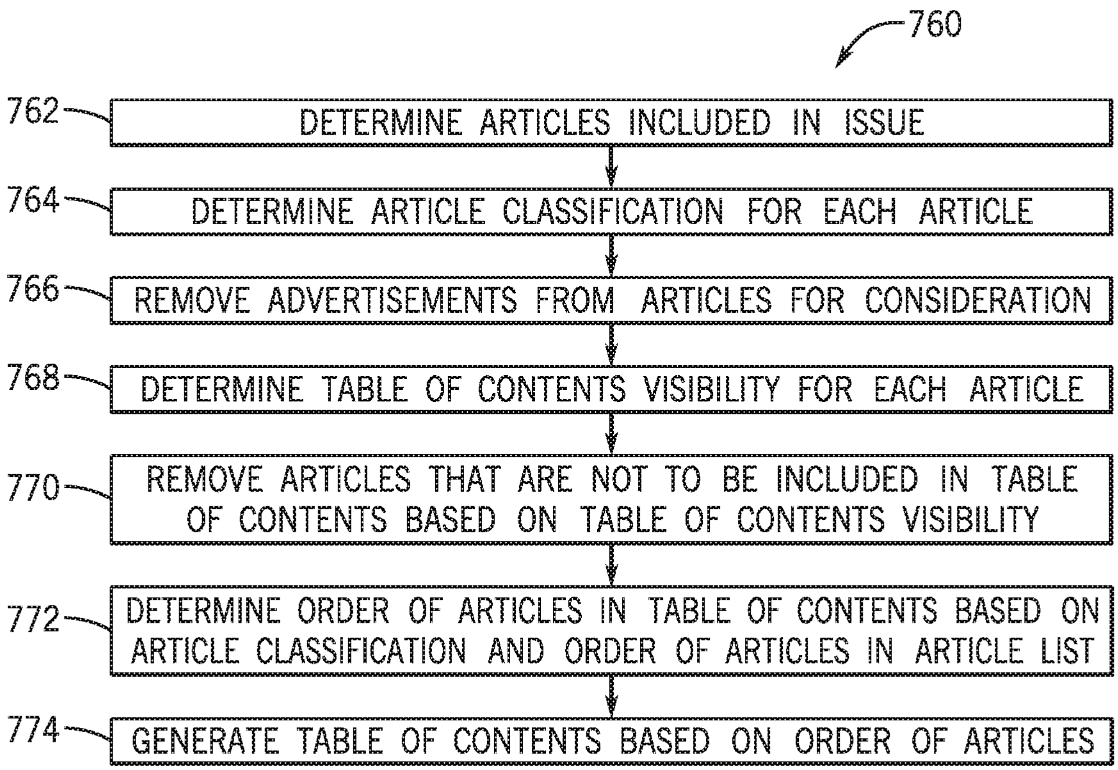
FIG. 46 is a flow diagram of a process for generating a table of contents, according to embodiments of the present disclosure.

As discussed above, the cloud publishing device 66 may generate a table of contents based on the articles included in an issue. To help elaborate, FIG. 46 is a flow diagram of a process 760 for determining and ordering articles within a table of contents. The process 760 may be implemented in the form of an application program that includes instructions that are executed by at least one suitable processor of a computer system, such as the processing circuitry 70 of the cloud publishing device 66. The illustrated process 760 is merely provided as an example, and in other embodiments, certain illustrated steps of the process 760 may be performed in other orders, skipped, or repeated, according to embodiments of the present disclosure. As discussed below, the process 760 generally includes determining articles in an issue based on the article list 520 (e.g., process block 762), determining an article classification for each article (e.g., process block 764), removing advertisements from consideration (e.g., process block 766), determining table of contents visibility for each article (e.g., process block 768), removing from consideration articles that are indicated as not to be included in the table of contents (e.g., process block 770), determining an order of articles in the table of contents based on article classification and the order of articles in the article list 520 (e.g., process block 772), and generating the table of contents based on the determined order of articles (e.g., process block 774).

At process block 762, the cloud publishing device 66 may determine the articles included in an issue, for instance, based on the article list 520. As discussed above, the articles included in an issue may include advertisements in addition to other articles, such as news articles and opinion pieces.

At process block 764, the cloud publishing device 66 may determine the article classification 218 for each article. In other words, the cloud publishing device 66 may determine whether an article is a featured article, advertisement, or other type of article (e.g., a regular, non-featured article). At process block 766, the cloud publishing device may remove articles determined to be advertisements from consideration for inclusion in the table of contents.

At process block 768, the cloud publishing device 66 may determine a table of contents visibility for each article, for example, based on the visibility indicator 740 associated with each remaining article. At process block 770, the cloud publishing device 66 may remove from consideration for inclusion in the table of contents articles that are determined not to be visible in the table of contents.

At process block 772, the cloud publishing device 66 may determine an order for remaining articles based on the articles' article classifications 218 and the order of articles in the article list 520. For example, as noted above, featured articles may be included in the table of contents before non-featured articles. Additionally, articles may otherwise be listed in the table of contents based on the order of the articles in the article list 520. Furthermore, at process block 774, the cloud publishing device 66 may generate the table of contents based on the determined order of articles. That is, the cloud publishing device 66 may generate a table of contents and include within the table of contents an indication of the articles included in the issue, and the items listed in the table of contents may be listed in the order determined at process block 772.

As noted above, in some embodiments, performance of the process 760 may be performed in an order that differs from the order presented in FIG. 46. For example, the cloud publishing device 66 may determine a table of contents visibility for each article and remove the articles that are indicated as not to be visible from the articles being considered before determine an article classification for the remaining articles.

Figure 47:
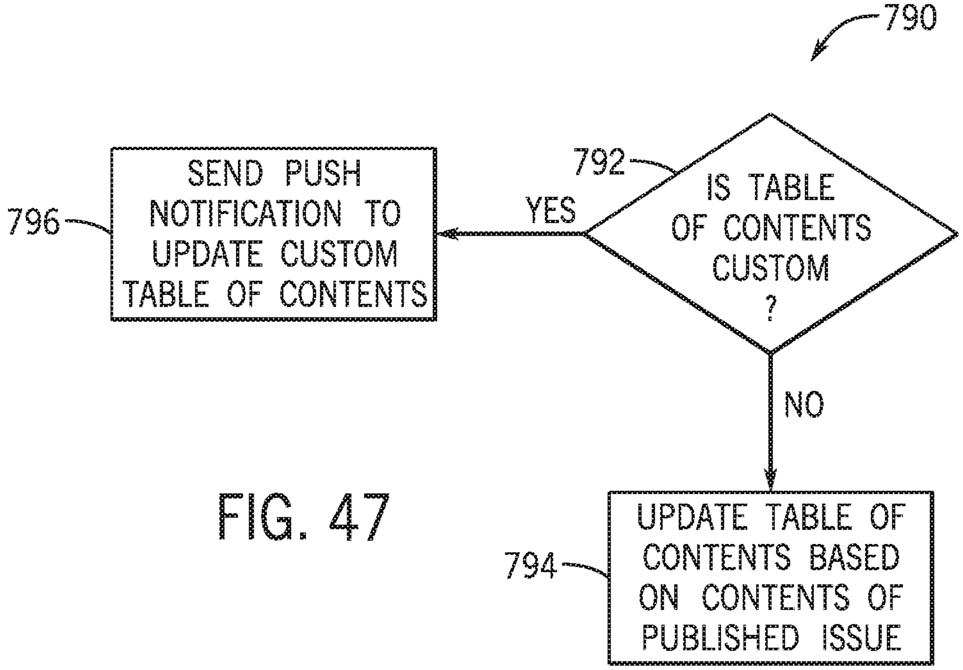
FIG. 47 is a flow diagram of a process for updating a table of contents, according to embodiments of the present disclosure.

As also discussed above, content providers may perform various actions that cause a table of contents to be updated. Examples include unlocking a draft issue for editing as well as modifying a draft issue. However, as also discussed above, users may also customize the table of contents. For example, users may rearrange the order of articles listed in the table of contents, alter whether an article is included in the table of contents, or make and use their own table of contents. When a customized table of contents is utilized, updating the table of contents may alter the customizations made by a user. For example, updating a table of contents may cause the table of contents to list articles included in an issue according to the process 760, whereas a user's customized table of contents may have included different articles and/or articles in a different order. With this in mind, FIG. 47 illustrates a flow diagram of a process 790 for updating a table of contents. The process 790 may be implemented in the form of an application program that includes instructions that are executed by at least one suitable processor of a computer system, such as the processing circuitry 70 of the cloud publishing device 66. The illustrated process 790 is merely provided as an example, and in other embodiments, certain illustrated steps of the process 790 may be performed in other orders, skipped, or repeated, according to embodiments of the present disclosure. As discussed below, the process 790 generally includes determining whether a table of contents to be updated is a custom table of contents (e.g., decision block 792) and updating a table of contents based on the contents of a published issue upon determining that the table of contents to be updated is not a custom table of contents (e.g., process block 794) or sending a push notification to manually update a custom table of contents upon determining that the table of contents to be updated is a custom table of contents (e.g., process block 796).

At decision block 792, the cloud publishing device 66 may determine whether a table of contents to be updated is a custom table of contents. As discussed above, a table of contents may be considered to be custom when a content provider has made its own table of contents or when a generated table of contents has been modified. For example, a table of contents in which the order of articles has been modified or in which the articles that appear in the table of contents have been modified, the table of contents may be considered a custom table of contents. Upon determining that a table of contents to be updated is not a custom table of contents, at process block 794, the cloud publishing device 66 may update the table of contents based on the contents of a published issue. For example, in the case of when a draft article is unlocked for editing, as described above, a draft table of contents may be updated to reflect the content included in a published issue corresponding to the draft issue in which the draft table of contents is included. As another example, a table of contents may be updated in a manner generally to the process 760 of FIG. 46. For instance, the cloud publishing device 66 may make determinations regarding article classifications of an issue, table of contents visibilities of the issue, and an article list (e.g., data included in a published issue regarding an order of articles in the issue) to determine articles that should be included in the table of contents as well as the order of those articles in the table of contents and update the table of contents.

However, if at decision block 792, the cloud publishing device 66 determines that the table of contents to be updated is a custom table of contents, at process block 796, the cloud publishing device 66 may provide a notification, such as a push notification, to the content provider to manually update the table of contents. For example, rather than update the table of contents in accordance with process block 794, it may be beneficial to allow a content to provider to manually make changes to a table of contents because updating a table of contents in accordance with the techniques associated with process block 794 may cause the customized portions of the table of contents to be overwritten or otherwise changed. The push notification may be provided via the user interface 660.

The technical effects of the present disclosure include a cloud publishing device 66 that may enable content providers 62 to manage how content is arranged and provided to end users (e.g., users of electronic devices 10). More specifically, the cloud publishing device 66 may enable content, such as articles, to be arranged into issues, for editable tables of contents to be generated, and for modifications to issues to be made after being published. For instance, by maintaining draft versions and published versions of issues (as well as content included in issues, such as tables of contents and articles), the cloud publishing device 66 enables editing of content to occur without causing a publically available version of the content to be modified. Furthermore, the presently disclosed techniques enable collections of content that include content that can be specific to a collection (e.g., an issue-specific article) as well as content that is not specific to a collection (e.g., an issue-independent article). When modifications to content are made outside of a collection, such as an issue, the cloud publishing device 55 enables the changes to be propagated to the content that is related to the content that has been modified.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A non-transitory, computer-readable medium comprising instructions that, when executed, are configured to cause processing circuitry to:

provide a cloud-based application that maintains an editable draft issue comprising a plurality of draft articles, wherein each of the plurality of draft articles comprises an article classification and a table of contents indicator, wherein the article classification is indicative of whether a respective draft article of the plurality of draft articles is a feature article, regular article, or advertisement, wherein the table of contents indicator is indicative of whether the respective draft article of the plurality of draft articles is to appear in tables of contents;

determine, based on the table of contents indicator of each draft article of the plurality of draft articles, a subset of the plurality of draft articles having a table of contents indicator indicative that the respective draft article is to appear in the tables of contents;

generate a draft table of contents for the draft issue, the draft table of contents comprising an indication of the subset of the plurality of draft articles;

generate a published issue comprising:

a plurality of published articles corresponding to the plurality of draft articles based on the draft issue; and a published table of contents generated based on the draft table of contents, wherein the draft issue is maintained after generating the published issue;

provide the published issue to one or more electronic devices; and after providing the published issue to the one or more electronic devices, provide an updated published issue to the one or more electronic devices based on a user input to modify the draft issue.

2. The non-transitory, computer-readable medium of claim 1, wherein:

the instructions, when executed, are configured to cause the processing circuitry to determine an order of articles within the subset of the plurality of draft articles based on the article classification of each article of the subset of the plurality of draft articles; and the draft table of contents for the draft issue comprises a listing of the subset of the plurality of draft articles in the determined order.

3. The non-transitory, computer-readable medium of claim 2, wherein the instructions, when executed, are configured to cause the processing circuitry to:

receive user input to modify the order of articles in the draft table of contents independently of an order of the draft articles in the subset of the plurality of draft articles within the draft issue, add or delete a section in the draft table of contents, or both; and generate a modified draft table of contents based on the user input.

4. The non-transitory, computer-readable medium of claim 3, wherein the instructions, when executed, are configured to cause the processing circuitry to send a notification to update the modified draft table of contents after a draft article, a published article, the draft issue, or the published issue has been modified.

5. The non-transitory, computer-readable medium of claim 2, wherein:

the plurality of draft articles comprises one or more advertisements; and the subset of the plurality of draft articles only includes draft articles of the plurality of draft articles other than the one or more advertisements.

6. The non-transitory, computer-readable medium of claim 2, wherein the draft table of contents comprises:

a first section comprising each respective article of the subset of the plurality of draft articles having an article classification indicating the respective draft article is a feature article; and a second section separate from the first section, the second section comprising each respective article of the subset of the plurality of draft articles having an article classification indicating the respective draft article is a regular article.

7. The non-transitory, computer-readable medium of claim 1, wherein the instructions, when executed, are configured to cause the processing circuitry to:

generate a draft table of contents indicative of at least a portion of the plurality of draft articles, wherein the draft table of contents comprises a first set of article identifiers indicative of the at least a portion of the plurality of draft articles; and generate, based on the draft table of contents, a published table of contents indicative of at least a portion of the plurality of published articles, wherein the published table of contents comprises a second set of article identifiers that is different than the first set of article identifiers and is indicative of the at least a portion of the plurality of published articles.

8. The non-transitory, computer-readable medium of claim 1, wherein the plurality of published articles comprises:

at least one issue-specific article that is only viewable within the published issue; and at least one issue-independent article that is published outside of the published issue for public consumption.

9. The non-transitory, computer-readable medium of claim 8, wherein the instructions, when executed, are configured to cause the processing circuitry to:

determine whether an outside article corresponding to the at least one issue-independent article has been published; and upon determining that the outside article has been published, provide an indication on a representation of the at least one issue-independent article that the outside article has been published.

10. The non-transitory, computer-readable medium of claim 1, wherein the instructions, when executed, are configured to cause the processing circuitry to:

after providing the published issue to the one or more electronic devices, modify the draft issue based on the user input to modify the draft issue;

generate the updated published issue based on the modified draft issue; and provide the updated published issue to the one or more electronic devices after generating the updated published issue.

11. The non-transitory, computer-readable medium of claim 1, wherein the instructions, when executed, are configured to cause the processing circuitry to:

generate a second draft issue; and identify one or more articles eligible to be included in the second draft issue based on channel associated with credentials of a user.

12. The non-transitory, computer-readable medium of claim 11, wherein the instructions, when executed, are configured to:

receive user input regarding a portion of the one or more articles;

add the portion of the one or more articles to the second draft issue;

receive user input regarding an order of the portion of the one or more articles; and arrange the portion of the one or more articles in the order indicated by the user input.

13. The non-transitory, computer-readable medium of claim 1, wherein:

the draft issue comprises a first plurality of identifiers indicating the plurality of draft articles; and the published issue comprises a second plurality of identifiers indicating the plurality of published articles, wherein the second plurality of identifiers indicates different data than the first plurality of identifiers.

14. The non-transitory, computer-readable medium of claim 1, wherein the instructions, when executed, are configured to cause the processing circuitry to:

receive user input to modify at least one draft article of the plurality of draft articles after generating the published issue, wherein a published article of the plurality of published articles included in the published issue is generated based on the at least one draft article; and modify the at least one draft article of the plurality of draft articles based on the user input without modifying a corresponding published article of the plurality of published articles.

15. A cloud-based publishing system comprising processing circuitry configured to:

receive content from one or more content providers, wherein the content comprises one or more articles;

generate a draft issue comprising a first set of data indicative of the one or more articles, wherein the first set of data comprises an article classification and a table of contents indicator for each of the one or more articles, wherein the article classification is indicative of whether a respective article of the one or more articles is a feature article, regular article, or advertisement, wherein the table of contents indicator is indicative of whether the respective article of the one or more articles is to appear in tables of contents;

determine, based on the table of contents indicator of each article of the one or more articles, a subset of the one or more articles having a table of contents indicator indicative that the respective draft article is to appear in the tables of contents;

generate a draft table of contents for the draft issue, the draft table of contents comprising an indication of the subset of the one or more articles;

generate a published issue based on the draft issue, wherein the published issue comprises:

a second set of data that is different than the first set of data and indicative of the one or more articles; and a published table of contents generated based on the draft table of contents, wherein the draft issue is maintained after generating the published issue;

provide the published issue for display on an electronic device; and after providing the published issue to the electronic device, provide an updated published issue to the electronic device based on a user input to modify the draft issue.

16. The cloud-based publishing system of claim 15, wherein the processing circuitry is configured to lock the draft issue from being edited after generating the published issue.

17. The cloud-based publishing system of claim 16, wherein the processing circuitry is configured to:

receive a request to unlock the draft issue for editing from a user;

unlock the draft issue for editing based on credentials of the user;

receive user input indicative of one or more modifications to the draft issue; and modify the published issue based on the one or more modifications to the draft issue indicated.

18. The cloud-based publishing system of claim 17, wherein the draft issue comprises a draft table of contents indicative of the one or more articles, wherein the processing circuitry is configured to update the draft table of contents based on the published issue after receiving the request to unlock the draft issue for editing.

19. A method for providing digital issues of digital content, the method comprising:

generating, via processing circuitry, a draft issue;

adding, via the processing circuitry and to a first set of data indicative of a plurality of draft articles in the draft issue, at least one issue-specific article to the draft issue and at least one issue-independent article to the draft issue, wherein the issue-specific article only exists in the draft issue and the issue-independent article is configured to exist outside of the draft issue, wherein the first set of data comprises an article classification and a table of contents indicator for the issue-specific article and each draft article of the plurality of draft articles, wherein the article classification is indicative of whether the issue-specific draft article or a respective draft article of the plurality of draft articles is a feature article, regular article, or advertisement, wherein the table of contents indicator is indicative of whether the issue-specific draft article or the respective draft article of the plurality of draft articles is to appear in tables of contents;

determine, based on the table of contents indicator of the issue-specific article and each draft article of the plurality of draft articles, a subset of articles, selected from the issue-specific article and the plurality of draft articles, having a table of contents indicator indicative that the respective draft article is to appear in the tables of contents;

generate a draft table of contents for the draft issue, the draft table of contents comprising an indication of the subset of the plurality of draft articles;

generating, via the processing circuitry, a published issue comprising:

a second set of data different than the first set of data, wherein the second set of data is indicative of the plurality of draft articles, the at least one issue-specific article, and the at least one issue-independent article; and a published table of contents generated based on the draft table of contents, wherein the draft issue is maintained after generating the published issue; and causing, via the processing circuitry, the published issue to be provided to an electronic device;

after providing the published issue to the one or more electronic devices, providing, via the processing circuitry, an updated published issue to the one electronic device based on a user input to modify the draft issue.

20. The method of claim 19, comprising:

receiving user input indicative of a modification to an outside article different from the at least one issue-independent article and the at least one issue-specific article, wherein the outside article comprises an article published outside of the published issue for public consumption;

determining that the outside article is related to one or more of the at least one issue-independent article; and modifying a portion of the second set of data determined to be related to the one or more of the at least one issue-independent article.

* * * * *